United States Patent
Guggino et al.

(10) Patent No.: US 11,713,551 B2
(45) Date of Patent: Aug. 1, 2023

(54) MATERIAL, PUSHER WITH MODULAR COMPOSITE SCRAPING EDGE

(71) Applicant: Pro-Tech Manufacturing and Distribution, Inc., Rochester, NY (US)

(72) Inventors: Michael J. Guggino, Bloomfield, NY (US); Barry Sherman, Dansville, NY (US); Thomas B. Maier, Oakfield, NY (US); James Maier, Ontario, NY (US); David Mack, Rochester, NY (US); Tim L. Gerkensmeyer, Elmore, OH (US); Tom Lennox, Cambridge (CA)

(73) Assignee: Pro-Tech Manufacturing and Distribution, Inc., Rochester, NY (US)

( * ) Notice: Subject to any disclaimer, the term of this patent is extended or adjusted under 35 U.S.C. 154(b) by 276 days.

(21) Appl. No.: 17/070,672

(22) Filed: Oct. 14, 2020

(65) Prior Publication Data

US 2021/0087765 A1    Mar. 25, 2021

Related U.S. Application Data

(62) Division of application No. 16/214,593, filed on Dec. 10, 2018, now Pat. No. 10,895,049.
(Continued)

(51) Int. Cl.
| | |
|---|---|
| *E01H 5/06* | (2006.01) |
| *E01H 5/12* | (2006.01) |
| *E01C 19/20* | (2006.01) |
| *B60R 19/00* | (2006.01) |
| *E01C 23/082* | (2006.01) |
| *E01C 19/15* | (2006.01) |

(52) U.S. Cl.
CPC ............... *E01H 5/06* (2013.01); *E01H 5/066* (2013.01); *E01H 5/12* (2013.01); *B60R 19/00* (2013.01); *E01C 19/15* (2013.01); *E01C 19/20* (2013.01); *E01C 23/082* (2013.01)

(58) Field of Classification Search
CPC ......... B60R 19/00; E01C 19/15; E01C 19/20; E01C 19/082; E01H 5/06; E01H 5/066; E01H 5/12
See application file for complete search history.

(56) References Cited

U.S. PATENT DOCUMENTS

| | | | |
|---|---|---|---|
| 1,432,352 | A | 10/1922 | Moricca |
| 1,853,715 | A | 4/1932 | Anderson |

(Continued)

FOREIGN PATENT DOCUMENTS

| | | |
|---|---|---|
| CA | 2566993 | 5/2007 |
| DE | 8300983 | 6/1983 |

(Continued)

OTHER PUBLICATIONS

Daniels Box Plow; A Box Plow with a Steel Tip Edge; www.danielsplows.com; 1 advertising page; Great Lakes & Northeast Big Truck & Equipment Traders—Apr. 27, 2001; Issue #16. Apr. 27, 2001.

(Continued)

*Primary Examiner* — Tara Mayo-Pinnock
(74) *Attorney, Agent, or Firm* — Duane C. Basch; Dawson Law Firm, PC

(57) ABSTRACT

An improved scraping edge for use on a plow blade employing at least one resilient scraping edge section for contact with a surface to be plowed and mounting holes to attach the scraping edge section to the plow blade.

19 Claims, 19 Drawing Sheets

Related U.S. Application Data

(60) Provisional application No. 62/597,136, filed on Dec. 11, 2017.

(56) References Cited

U.S. PATENT DOCUMENTS

| | | | |
|---|---|---|---|
| 2,061,585 | A | 11/1936 | Meyer |
| 2,480,348 | A | 2/1949 | Henry |
| 3,217,431 | A | 11/1965 | Heinzroth et al. |
| 3,477,149 | A | 11/1969 | Wagner |
| 3,736,644 | A | 6/1973 | Black et al. |
| 4,255,878 | A | 3/1981 | Mahler et al. |
| 4,707,936 | A | 11/1987 | Steinfoff |
| 5,079,866 | A | 1/1992 | Farrell |
| 5,109,618 | A | 5/1992 | Grubler et al. |
| 5,121,562 | A | 6/1992 | Feller |
| 5,392,488 | A | 2/1995 | Li |
| 5,484,250 | A | 1/1996 | Gilmore, Jr. et al. |
| 6,188,369 | B1 | 1/2001 | Bright et al. |
| 6,247,540 | B1 | 6/2001 | Clemen et al. |
| 7,647,983 | B2 | 1/2010 | Gharsalli |
| 7,658,022 | B2 | 2/2010 | Strait |
| 8,887,413 | B2 | 11/2014 | Miller |
| 8,936,428 | B1 | 1/2015 | Page |
| 9,151,006 | B2 | 10/2015 | Guggino et al. |
| 9,243,376 | B2 | 1/2016 | Guggino et al. |
| D749,151 | S | 2/2016 | McAdam et al. |
| D749,650 | S | 2/2016 | McAdam et al. |
| 9,885,160 | B1 | 2/2018 | Stone |
| 2005/0126051 | A1 | 6/2005 | Fatemi |
| 2006/0070264 | A1 | 4/2006 | Lachance et al. |
| 2006/0218822 | A1 | 10/2006 | Hosmer |
| 2007/0193755 | A1 | 8/2007 | Kuper |
| 2008/0052929 | A1 | 3/2008 | Paonessa |
| 2008/0189990 | A1 | 8/2008 | Luhtanen |
| 2012/0017473 | A1 | 1/2012 | Paonessa |
| 2013/0174452 | A1 | 7/2013 | Diehl et al. |
| 2013/0212912 | A1 | 8/2013 | Guggino et al. |

FOREIGN PATENT DOCUMENTS

| | | |
|---|---|---|
| FR | 2537438 | 5/1984 |
| SE | 503193 | 4/1996 |
| WO | WO2006123982 | 11/2006 |

OTHER PUBLICATIONS

Bonnell Push 'N-Plow brochure; 5 pages; Bonnell Industries Inc., 1385 Franklin Grove Rd., Dixon, IL 61021; Fax Date May 3, 2002 May 3, 2002.

Communication enclosing Ronnbloom 1 page brochure; 3 Ronnbloom invoices dated Jan. 31, 1998 Jan. 31, 1998.

C.U.E., Inc. Polyurethane Materials Data Sheet, 1 page. Jan. 1, 2013 Jan. 1, 2013.

Degelman Dozer Blades 4WD Series brochure, 95 pages, 1978-1980, Degelman Industries Ltd., PO Box 830, Regina, SAS, CA. Jan. 18, 2011 Jan. 18, 2011.

Degelman 40 years Brochure 1962-2002; 24 pages; Degelman product brochure 2002; Degelman Industries Ltd; 272 Industrial Dr. Regina, SAS, CA S4P 3B1; degelman.com Feb. 2, 2011 Feb. 2, 2011.

Development of Combined Automatic Blade Control for Snow-Removing Grader, Komatsu Technical Report, vol. 48, No. 150, 6 pages. Jan. 1, 2002 Jan. 1, 2002.

JRB Quick Couplers & Attachments brochure 4 pages; JRB Company,Inc.; 2444 Gilcrist Rd., Akron, OH 44305 Jan. 20, 2011 Jan. 20, 2011.

Ledex Avalanche Bury the Competition Advertisement 5 pages; 1998; Ledex Industries Corp, 307 Humberline Drive, Toronto, Ontario, CA Jan. 20, 2011 Jan. 20, 2011.

Meyer Products, Turn Your Skid Steer into An All-season Performer brochure, 4 pages. Jan. 1, 2010 Jan. 1, 2010.

Pro-Tech Snowpushers, 4 pages. Mar. 3, 2007 Mar. 3, 2007.

RCS SnoPro color advertisement, 1 page; RCS Manufacturing and Development, 1029 Lyell Ave., Rochester, NY Jan. 20, 2011 Jan. 20, 2011.

Ronnblom Swedish Communication with translation and Drawing Sheet; Jan. 20, 2011 Jan. 20, 2011.

Cerified Swedish Priority Document, PCT/SE2006/000566, 10 pages. May 16, 2006 May 16, 2006.

Tink, Inc.; Hydraulic attachments for loaders and tractors brochure; 4th Edition; c. 1986 Tink, Inc.; 2361 Durham-Dayton Hwy., Durham, California; Jan. 20, 2011 Jan. 20, 2011.

Western Gallery|Western Products, Skid-Steer Snowplow Gallery; www.westernplows.com/gallery/skid-steer plow; 1 page. Nov. 1, 2014 Nov. 1, 2014.

Western Plows Webpage, www.westernplows.com/products/skid-steer; 1 page. Nov. 1, 2016 Nov. 1, 2016.

Western Products, Western Prodigy and Pro Plus Skid Steer Snowplows Owners Manual, 24 pages. Jul. 15, 2013 Jul. 15, 2013.

MATERIAL, PUSHER WITH MODULAR COMPOSITE SCRAPING EDGE

This application is a Divisional application of co-pending U.S. patent application Ser. No. 16/214,593 for a MATERIAL PUSHER WITH MODULAR COMPOSITE SCRAPING EDGE, filed Dec. 10, 2018 by Michael J. Guggino et al., which claimed the benefit under 35 U.S.C. § 119(e) from U.S. Provisional Patent Application No. 62/597,136, for a MATERIAL PUSHER WITH FLOATING COUPLING AND MODULAR COMPOSITE SCRAPING EDGE, by Michael J. Guggino et al., filed Dec. 11, 2017, both of which are hereby incorporated by reference in their entirety.

The embodiment disclosed herein relate generally to an improved material pusher or containment plow, and more particularly to a material pusher including one or more of a floating coupling system, a sectioned or modular, composite scraping edge, a front-pivoting adjustable angle wear shoe, and water-shedding features. The disclosed containment plow and features are believed to provide equipment capable of improving the surface outcome (e.g., single-pass, cleared to asphalt surface) as compared to conventional plowing devices including other material pushers.

BACKGROUND AND SUMMARY

A "pusher" differs from a typical snow plow blade or bucket as might generally be found on material moving equipment. Pushers, or containment plows, as described for example in U.S. Pat. No. 5,724,755 to Weagley (issued Mar. 3, 1998) or the folding Material Plow of U.S. Pat. No. 6,112,438, to Weagley et al. (issued Sep. 9, 2000), both assigned to Pro-Tech Welding and Fabrication, Inc. and hereby incorporated by reference in their entirety, include sides extending forward from the blade or mold board to assure material being pushed (e.g., material, water, debris, sludge, etc.) is contained or remains in front of the pusher, and is not directed to the side in a windrow as with conventional plows. Whereas larger material pushers are designed for use with loaders and other heavy-duty equipment for clearing parking lots, runways and roads, the technology is similarly applicable to smaller, lighter-weight pushers that may be attached to and driven by skid-steer loaders and agricultural and lawn/garden tractors having front or rear lifting capability (e.g., buckets). As will be appreciated the pushers are not only for snow removal, but for clearing of various types of material including debris, animal waste, etc.

Heretofore, a number of patents and publications have disclosed plow configurations, the relevant portions of which may be briefly summarized as follows: (i) U.S. Pat. No. 5,724,755 to Weagley, issued Mar. 3, 1998, discloses a snow pusher having a transverse blade, side plates, wear shoes and horizontal posts for attaching the pusher to a bucket loader; (ii) U.S. Pat. No. 6,112,438, to Weagley et al., issued Sep. 9, 2000, is directed to a foldable version of the snow pusher.

As noted above, conventional pushers or containment plows may be subject to improper use when operators seek to clean or clear various types of ice and snow. For example, one pusher configuration that works for removal of significant accumulations of light snow may not work well when the operator attempts to use the same configuration to remove packed snow and ice. Moreover, operators have founds ways of operating the pushers to try and handle various conditions, and in many cases the snow pusher, or the vehicle used to drive snow pusher, can be subjected to excessive wear or damage. As an example, an operator may tend to run a pusher by applying extra (excessive) downward force by pushing the vehicle bucket, and the pusher, downward and to lift the front wheels of the loader off the ground. Such use tends to apply a greater downward pressure on the pusher scraping edge, but also results in excessive wear and premature failure of the wear shoes on the sides of the pusher as well as the rubber or polymeric (e.g., polyurethane) scraping edge itself. Moreover, operating with the front wheels off the ground reduces the ability to control the vehicle and the pusher, and often leads to damage to both the equipment and the surroundings (e.g., surface, curbs, landscaping, lighting poles, etc.). Another example is running the pusher with the front slightly elevated and the back of the wear shoe the only contact with the ground. Again, this is done in an attempt to apply more downward pressure on the pusher scraping edge in order to clear hard to remove ice, packed snow, etc.

In yet a further example, it is known to use metal scraping edges on plows and pushers—particularly for removal of packed snow and ice. An example of metal scraping edges are found, for example, on the Steel Edge line of snow pushers available from Pro-Tech® and as disclosed in U.S. Pat. No. 8,621,769, to Weagley et al., issued Jan. 7, 2014, or U.S. Pat. No. 9,151,006, to Guggino et al., issued Oct. 6, 2015, the disclosures of both patents being hereby incorporated by reference in their entirety. However, an astute observer will appreciate that the use of metal plow edges, even when employed on snow pushers with wear shoes, can result in damage to the inherently soft asphalt or similar materials or to the plow components. Indeed, operators that use containment plows or pushers to clear large areas such as parking lots, airports and the like, often employ different pusher and scraping blade configurations depending upon the snow conditions. Thus, there remains a need for a material pusher that can easily be employed across a broader range of snow and ice conditions.

In seeking to address these concerns, the disclosed embodiments are directed to features that result in improved performance of the material pusher, without the need for an operator pushing the equipment to and beyond its limits. Several features of the disclosed embodiments are directed at improving both the contact of the scraping edge with the surface being cleared, as well as consistently maintaining that relationship. The improvements to the scraping edge itself, along with a pivoting wear shoe that can be employed to adjust to a plurality of positions, and are believed to not only improve its performance but to eliminate the need (other than when reversing a worn edge) for adjustments to the scraping edge.

As noted above, among snow and ice professionals there is an ongoing discussion about which is better, rubber edge or steel edge snow pushers. The removable scraping edge disclosed in several embodiments herein provides the benefits of both. The rubber scraping edge with a steel insert can both conform to a surface to squeegee wet heavy snow and scrape hard pack. Instead of a long edge, the removable scraping edge may be "packaged" in sections allowing for easy replacement if or when needed. The removable scraping edge is also built for longevity (e.g., 350-500 hours of heavy plowing use), before needing to be replaced. Steel is embedded in both sides of the improved scraping edge sections, allowing customers to easily remove and flip the edge sections, and continue plowing if one side is worn. Furthermore, the central portion of each removable scraping edge section is flexible (no steel in central portion), permitting the removable scraping edge section to trip (flex) over obstacles such as manhole covers.

Another feature of the snow or material pusher embodiments disclosed herein is a floating coupler that allows the cutting edge to better adapt or contour to the surface, giving the operator more control. The floating coupler not only moves up and down (vertical) but also sideways (horizontal) and oscillates or tilts. This additional movement allows the plow to freely float without obstruction, improving surface outcome. Moreover, the floating coupler has no pushing or stacking limitations.

For many standard snow pushers and containment snow plows, adjusting the rubber plowing edge can sometimes be time consuming. The typical adjustment process consists of loosening bolts and shifting a long piece of rubber into an optimal position (usually ⅛" to ¼" below the wear shoe) and then retightening the bolts. While this process works for many snow and ice management professionals, the use of adjustable wear shoes significantly reduces the need for adjustment of the scraping edge, thereby significantly improving that process. Cutting or scraping edge depth adjustment can now be accomplished at the wear shoes—where only two adjustments need to be made, one on each end of the pusher. In one of the embodiments disclosed in detail below, operators simply pull a pin or a bolt on each wear shoe, find the optimal position based upon the scraping edge wear and re-insert the pin or bolt to adjust not only the wear shoe angle, but the contact between the scraping edge and the surface being cleaned. This design not only decreases maintenance requirements but also allows the operator to set how aggressive they want to plow, whether clearing snow from a gravel surface or trying to clear hard pack snow and ice. The adjustable wear shoe is also suitable for use with extended or self-leveling wear shoes, which helps the operator maintain a level plowing position at all times.

Disclosed in embodiments herein is a containment plow (material pusher) for clearing material from a surface, comprising: an upstanding transverse blade with a front surface and a rear surface, said rear surface of said blade being reinforced by at least one longitudinal channel extending substantially the length of and in parallel with said blade; vertical side plates attached to and extending at least forward from vertical edge at the end of said transverse blade; a floating coupler affixed to the rear of said blade, said floating coupler providing an interface by which the containment plow may be attached to a vehicle, where said floating coupler permits relative movement between the vehicle and the containment; a plurality of removable scraping edge sections, positioned adjacent one another along a bottom edge of said blade, at least one of said scraping edge sections presenting a plurality of faces for contact with the surface; and an adjustable wear shoe freely pivotally attached adjacent a front edge of the vertical side plates.

Further disclosed in embodiments herein is a floating coupler for use on a containment plow, said coupler comprising: a plurality of ribs extending rearward from said containment plow, each of said ribs having at least two apertures therein, a pair of longitudinal members slidably located within the apertures of said ribs and attached at either end to a spacer, said spacers separating the longitudinal members yet allowing for the longitudinal members to slide in at least two directions (vertical and horizontal) relative to the containment plow; said coupler being affixed to the rear of the containment plow and providing an interface by which the containment plow may be attached to a vehicle, where said floating coupler permits relative movement between the vehicle and the containment plow.

Also disclosed herein is a removable scraping edge section for use on a containment plow, comprising: a resilient scraping edge section presenting a plurality of faces for contact with the surface to be plowed.

Further disclosed in embodiments herein is an adjustable wear shoe freely pivotally attached adjacent a front edge of a vertical side plate on a containment plow, comprising: am angular control mechanism where the angular orientation of the wear shoe relative to the side plate is adjustable to one of a plurality of fixed positions (in order to control the amount of contact between a scraping edge of the plow and a surface being cleared).

Also disclosed herein is a containment plow (material pusher), wherein at least one longitudinal channel contacts the rear surface of the blade at a downward-sloping angle when the containment plow is in a position suitable for use on a horizontal surface, whereby the downward-sloping angle facilitates the shedding of liquid (e.g., water) therefrom.

Figure 1:
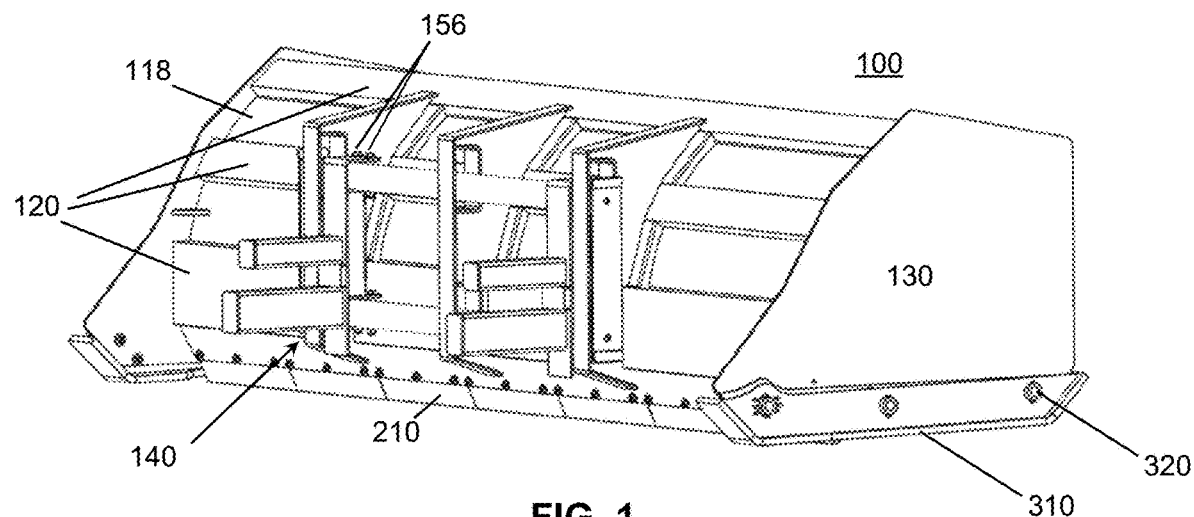
FIGS. 1-2 are exemplary illustrations of an embodiment and features of an improved material pusher or containment plow, incorporating a floating coupler, adjustable front-pivoting wear shoes, and a wear-resistant scraping edge.
Figure 2:
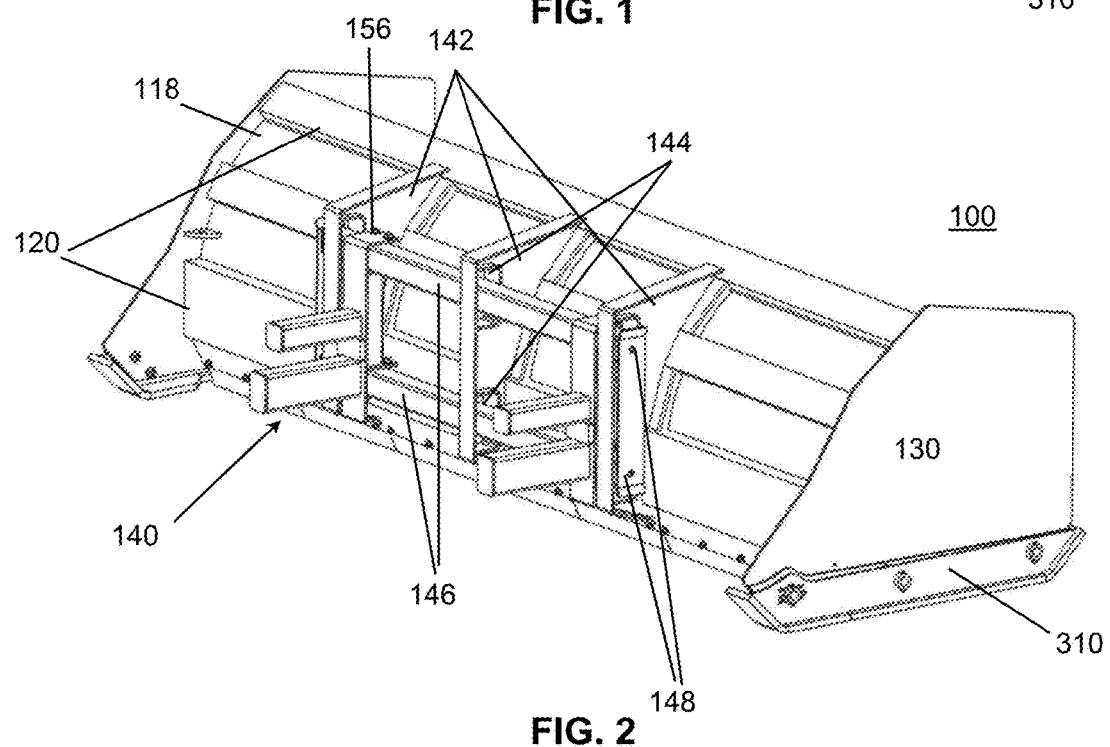
Figure 3:
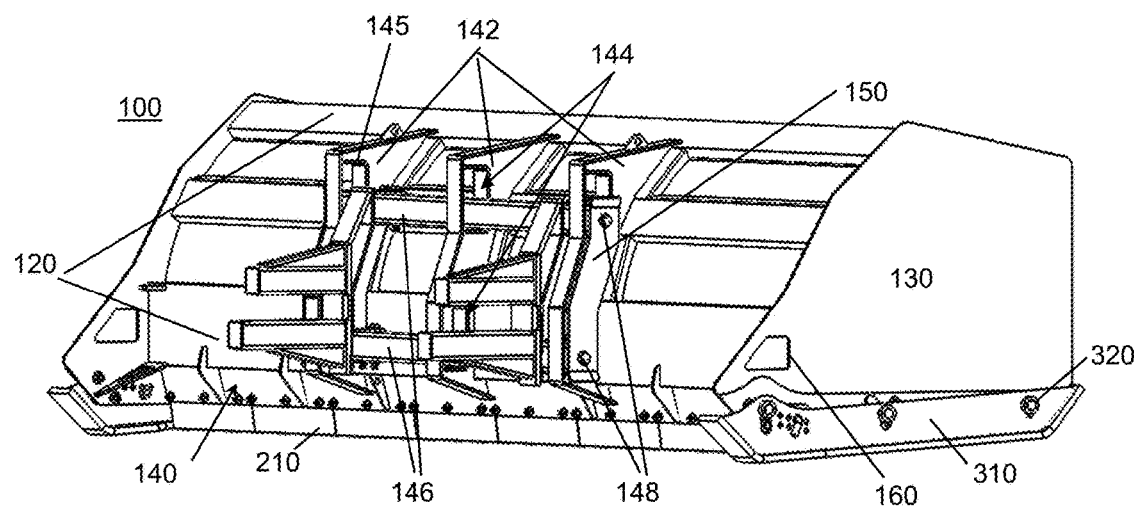
FIGS. 3-5 and 8 are exemplary illustrations of an alternative embodiment of the material pusher of FIG. 1, wherein the modified floating coupler employs off-set longitudinal members.
Figure 4:
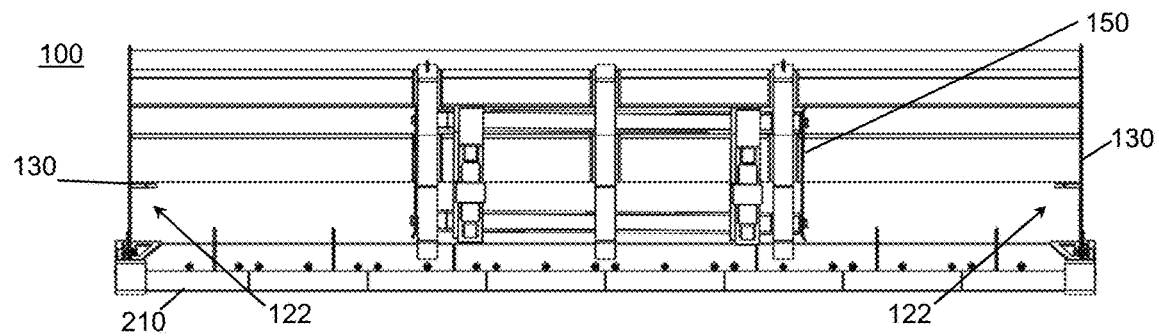
Figure 5:
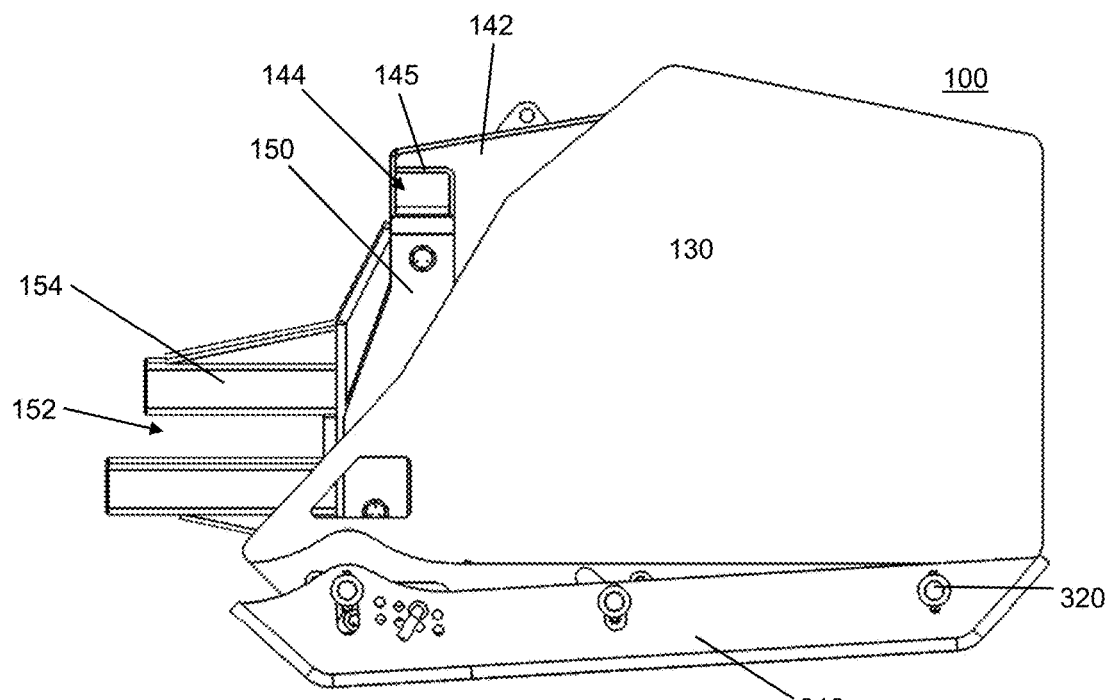
Figure 6:
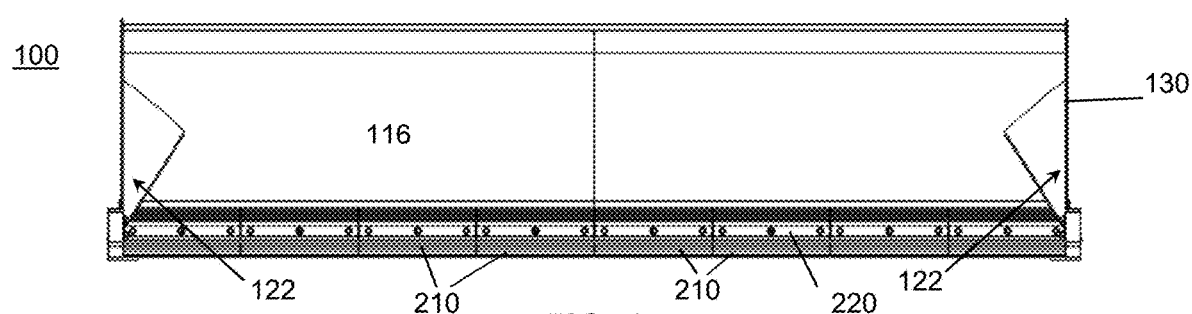
FIGS. 6 and 7 are exemplary illustrations of a front and front perspective view of a material pusher in accordance with the embodiments of FIGS. 1-5.
Figure 7:
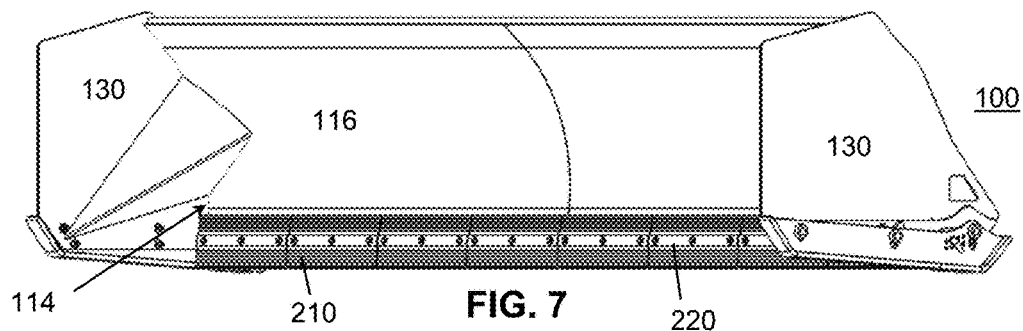
Figure 8:
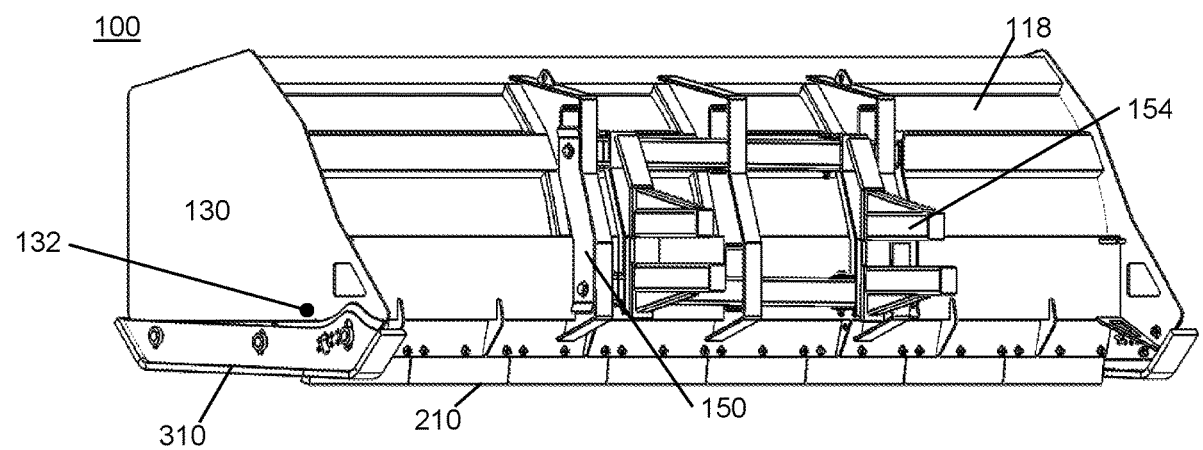
Figure 9:
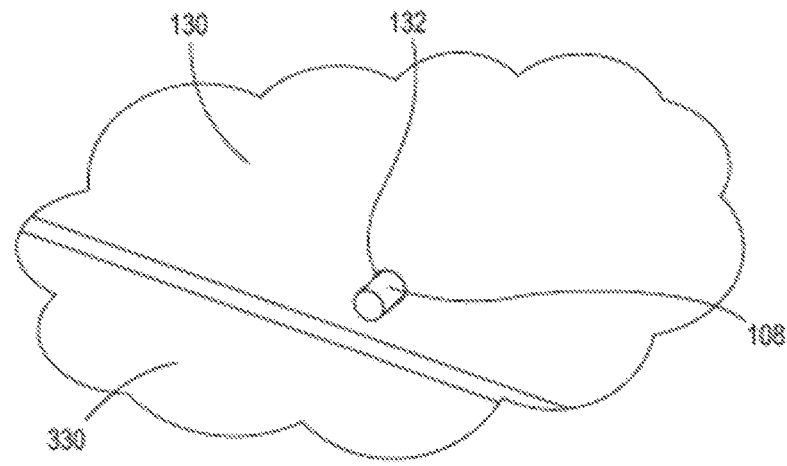
FIG. 9 is an illustration of an optional pre-assembly feature of the material pusher embodiments of FIGS. 1-8.
Figure 10:
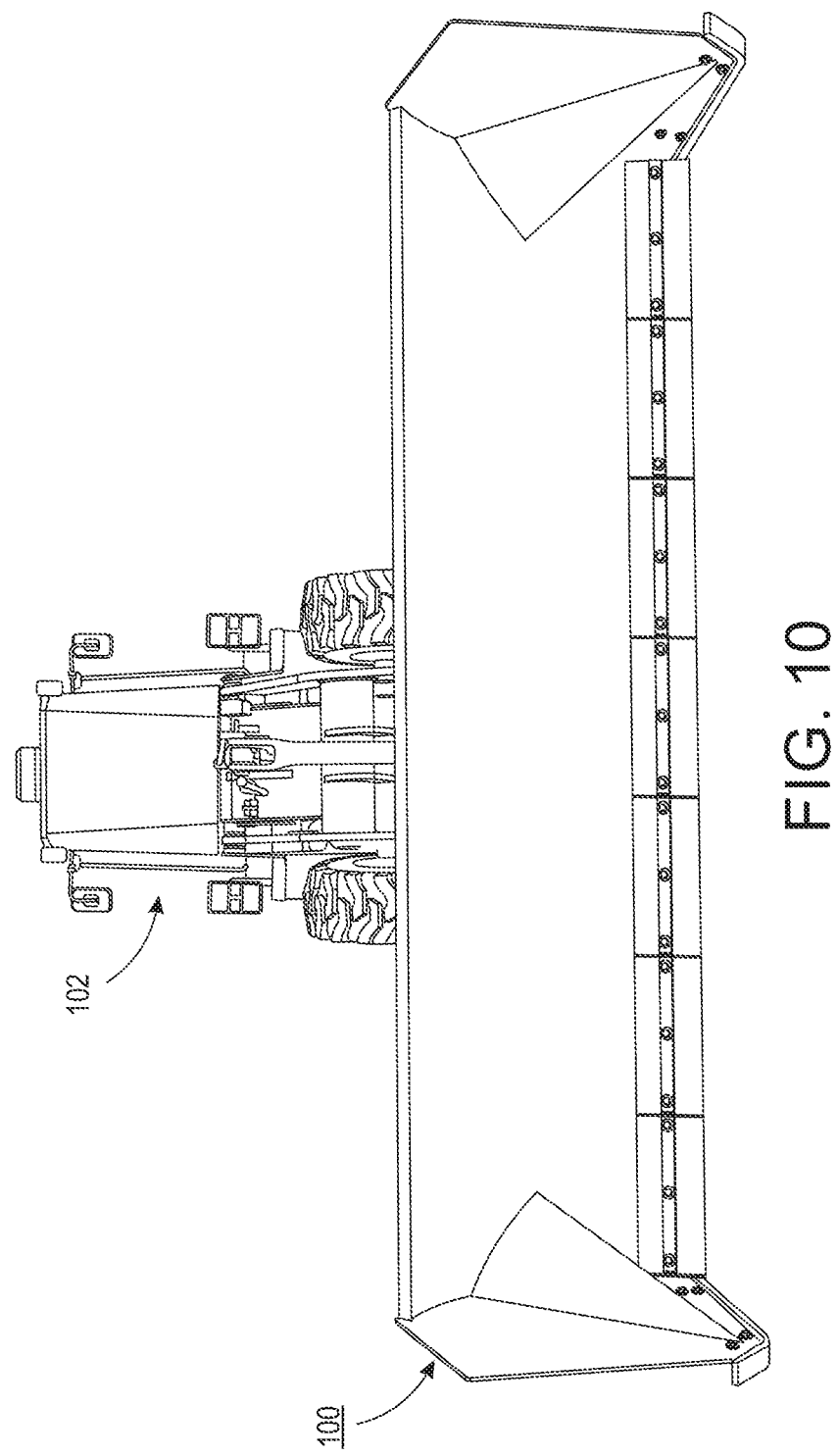
FIG. 10 is an exemplary illustration of a material pusher as in the embodiments of FIGS. 1-9 coupled to a vehicle in accordance with one embodiment for use of such a pusher.

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

Referring to FIGS. 1-11, depicted in these figures are various representations of embodiments for an improved containment plow 100, or synonymously a material pusher. In the figures, containment plow or material pusher 100, which may be employed for clearing material from a surface 110, comprises an upstanding transverse blade 114 with a front surface 116 and a rear surface 118, the rear surface of blade 114 being reinforced by at least one longitudinal channel 120 extending substantially the length of and in parallel with a longitudinal axis of the blade. Vertical side plates 130 are attached by welding, or similar permanent affixing method, to and extending at least forward from a vertical edge 122 at the end of said transverse blade. As will be appreciated, in the depicted embodiments at least the lowermost portion of side plates 130 extend rearward beyond the back of the blade 114 as well.

A floating coupler system 140 is affixed to the rear 118 of blade 114, the floating coupler providing an interface by which the containment plow 100 may be attached to a vehicle 102 (e.g., see FIG. 10) where, for example, the bucket of loader 102 is inserted and retained within slot 152 in interface component 154. The floating coupler system permits relative movement between the vehicle and the containment plow. Although the embodiments depicted in the figures do not depict any particular biasing elements tending to return the coupling to a neutral or "home" position (e.g., springs, rubber blocks or the like), such elements may be employed in an alternative embodiment.

In the embodiments depicted, the coupler system 140 includes a plurality of ribs 142 extending rearward from the back 118 of the transverse blade 114. Each of the ribs has at least two apertures 144 therein. A pair of longitudinal members 146 is slidably located within the apertures and the longitudinal members include threaded holes to receive fasteners 148 on the ends and are attached at both ends to spacers 150. Longitudinal members 146 may have round, rectangular or square cross-sections. Spacers 150 separate the longitudinal members 146 yet allow for the longitudinal members to slide a small distance in at least two directions, vertically and horizontally, relative to the transverse blade. Each of the apertures 144 further include a wide liner 145 (e.g., 2 in.-4 in. (5 cm-10 cm)) welded within and about the inner edge of the apertures so as to distribute contact force between the ribs (blade) and the longitudinal members 146 (vehicle) over a greater surface area and thereby facilitate sliding and reducing the likelihood of damage to the coupler components during use.

At least one attachment mechanism or interface component 154 is attached to the longitudinal members and provides an interface for releasable attachment to the vehicle or a component thereof to the coupler system. In this manner the vehicle is able to drive the material pusher via the coupling system 140, but there is a range of relative motion between the vehicle and the pusher so that the pusher "floats" and is able to self-adjust to the surface being plowed. The range of motion permitted is defined by the vertical distance of height of the apertures 144, and the horizontal distance or length of the longitudinal members 146 relative to the distance between the outermost edges of the ribs 142. A range of motion of between 2-6 inches is believed to be suitable to achieve the performance desired while not negatively impacting an operator's ability to control the pusher. This floating coupler system is believed to provide a degree of adaptability that has not been previously found in material pushers.

Another feature of the material pusher depicted in the figures is the use of a plurality of removable scraping edge sections 210. As illustrated, for example in FIGS. 6 and 7, the edge sections 210 are positioned and mounted, using removable fasteners that are inserted through or into mounting holes in proximity to the blade bottom edge, adjacent one another on the front surface 116 along a bottom edge of blade 114. Furthermore, at least one of the scraping edge sections may include a plurality of faces for contact with the surface to be cleaned or scraped. The use of multiple surfaces assures that even when the bottom of the scraping edge may be flexed or folded backward, as the plow is moved forward over a surface, the scraping edge will present at least one acute-angle edge to scrape packed snow, ice or similar materials from the surface. Various alternative configurations and profiles for the scraping edges are illustrated in FIGS. 12 through 26 as more specifically described below.

In one embodiment, the scraping edge section 210 is flexible in at least one direction, so that it may adapt to the surface that is being scraped. Moreover, at least a front-facing exterior of the scraping edge sections, in the top and bottom regions, 214 and 216, respectively includes a face forming an acute angle with an adjacent face. As noted above, this assures that there is a "sharp" edge 230 available for contact with the surface even if the bottom-most portion of the scraping edge is flexed or folded rearward. And, in one embodiment the flexible scraping edge section 210 is reversible, so that once a bottom region has been word down, the section may be rotated so the top region is on the bottom and the edge is re-attached to the blade. To facilitate ease of installation and rotation of the scraping edge sections, each edge section includes a plurality of mounting holes 226 spaced 6 in.-10 in. (15 cm-25 cm) apart along a mid-line or a mid-section thereof, where the holes are used to retain the scraping edge section 210 in a generally fixed position relative to the bottom edge of the transverse blade 114. As will be appreciated, several of the scraping edge cross-sections also include middle region 218 along a longitudinal face thereof, which is recessed relative to the top and bottom sections for receipt of a backing plate. The use of a recessed region on the face of each section is believed to be advantageous to prevent the edge sections from sliding or creeping upward on the front face 116 of blade 114. Moreover, the backing plate 220 may or may not span multiple adjacent edge sections to assure alignment of the adjacent sections.

Figure 15:
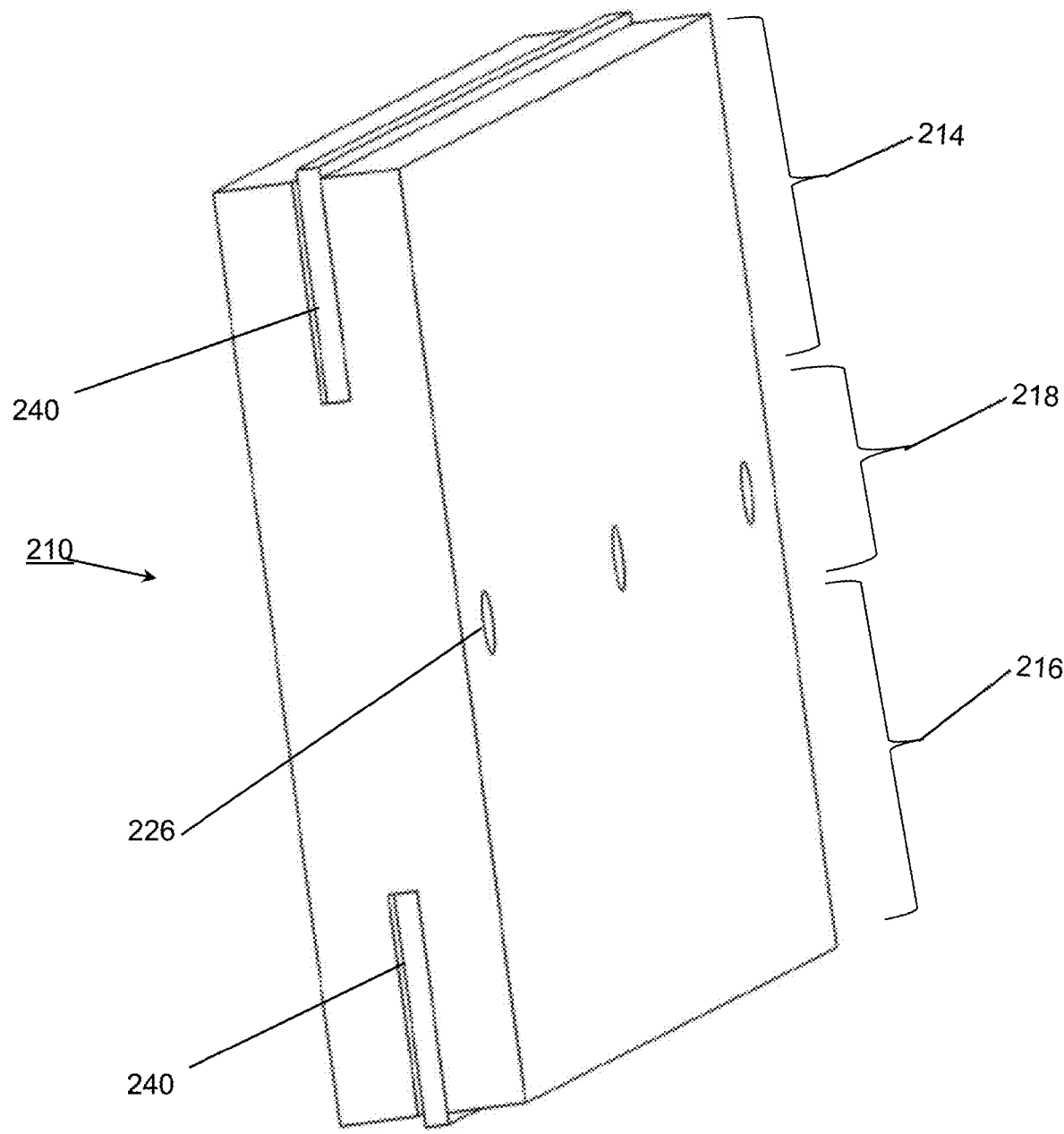
Figure 16:
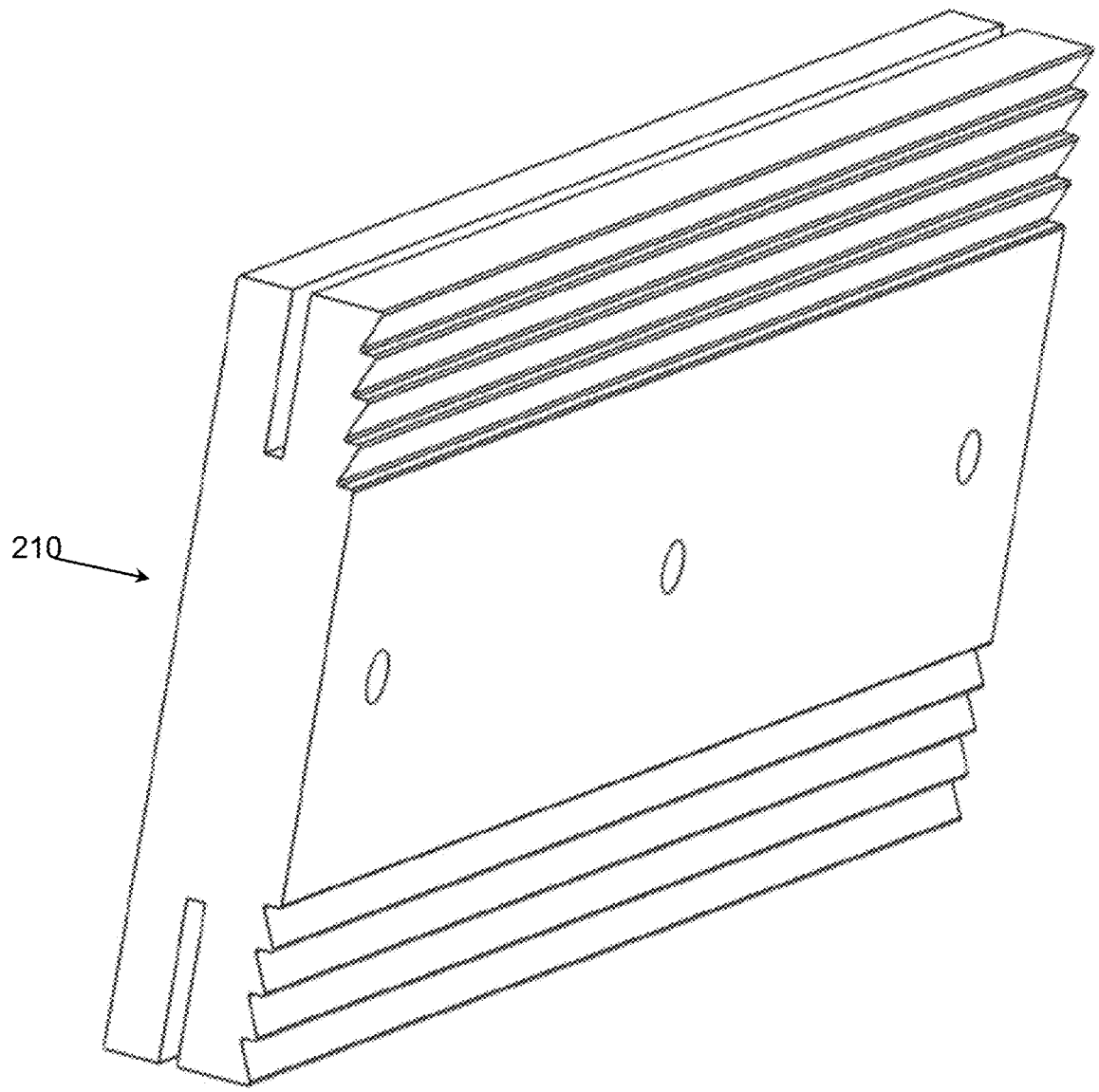
Figure 17:
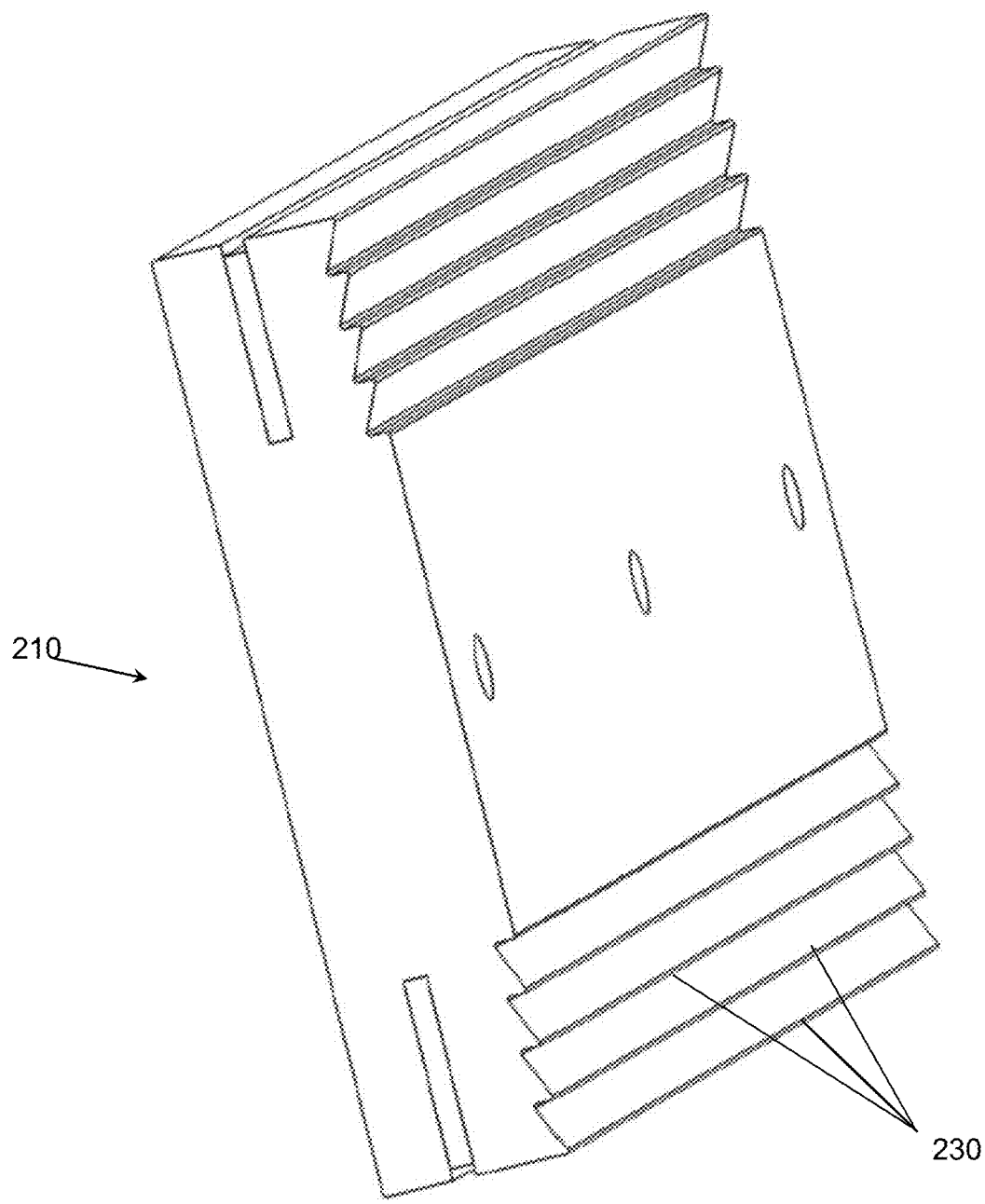
Figure 18:
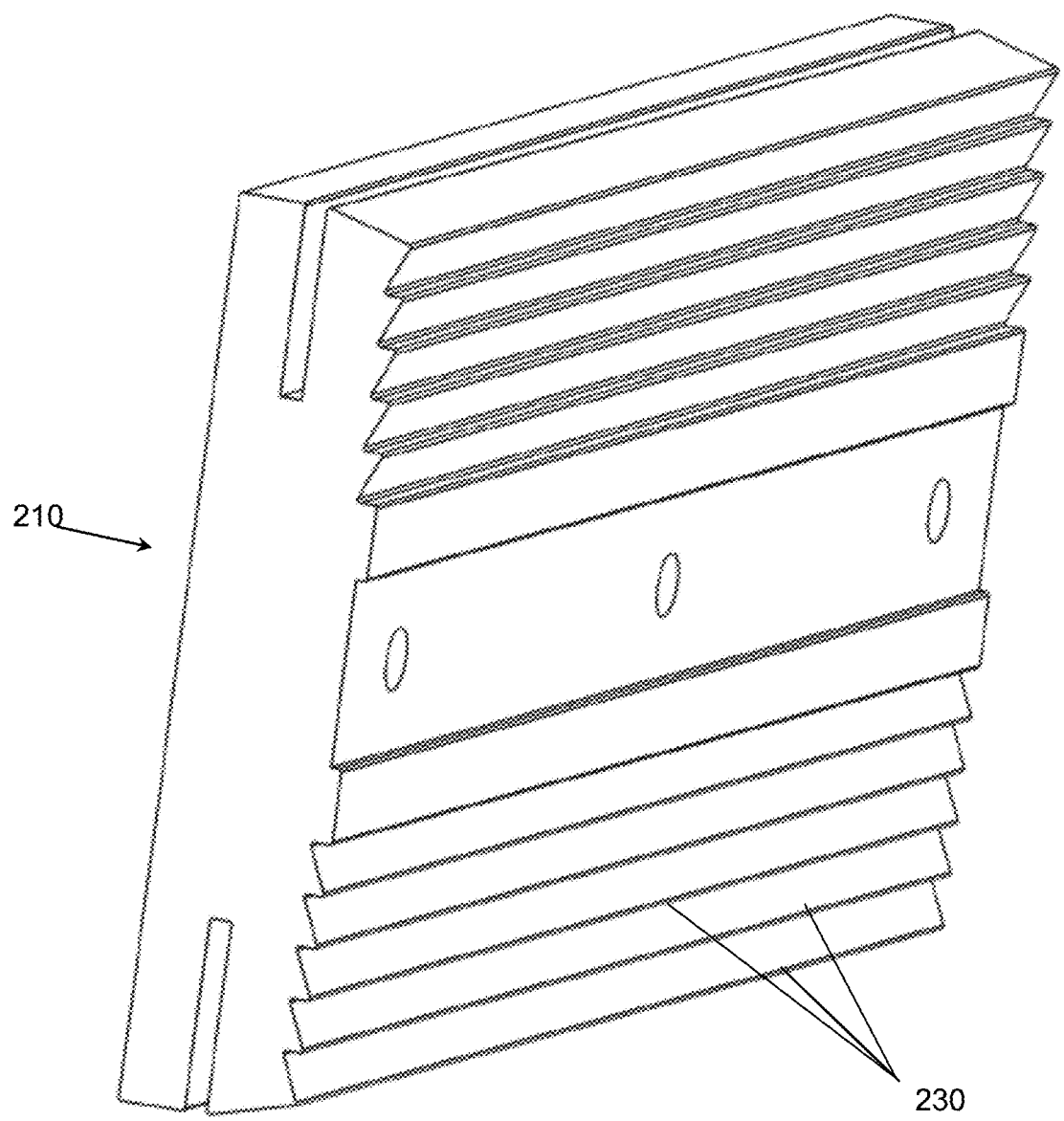

In another alternative embodiment, scraping edge sections 210 may also include a wear resistant material, such as a wear-resistant insert 240 as depicted in FIG. 15. And, as illustrated, for example in FIGS. 14-22, the scraping edge section has a generally H-shaped cross-section (e.g., FIG. 14), where the upper and lower edges thereof include a wear-resistant material inserted or infused longitudinally therein. As used herein the term "wear-resistant" is intended to characterize a material that has a hardness greater than that of the balance of the scraping-edge section, such that the wear-resistant material exhibits less propensity to wear in comparison to the rubber or polymer materials used for forming the balance of the flexible scraping edge. It will be appreciated that various wear-resistant materials may be employed, including high-durability polymers, metals (e.g., steel) and ceramics, as well as composites and combinations thereof. Ideally the wear-resistant material, when combined with the flexibility of the scraping edge, provides suitable stiffness and wear-resistance to improve the life of the scraping edge, while the scraping edge section itself provides flexibility so that the edge does not damage or excessively wear the surface being plowed. It should also be noted that the flexible rubber or polymeric materials are frequently referred to in the industry, and likewise herein, simply as "rubber" without regard to the particular type of material or composite employed.

Next, referring to FIGS. 1, 3 and 27-30, the material pusher 100 also includes an adjustable wear shoe 310 that is freely pivotally attached by a pin 320 adjacent a front edge of the vertical side plates 130. The angular orientation of each wear shoe 310 relative to a respective side plate 130 is adjustable to one of a plurality of fixed positions to control the amount of contact between the scraping edge sections and the surface. In one embodiment, each side plate includes a bolt-on pin plate 330, attached to the outer surface of side plate 130 adjacent the lower edge thereof, where the pin plate includes at least pivot pin 320 aligned to pass through a corresponding aperture in the wear shoe 310. The pin plate, as more fully illustrated in FIGS. 27-30, for example, includes a plurality of arranged holes 332 and the wear shoe 310 also includes a plurality of differently-arranged apertures 312 so that a fastener passing through different combinations of arranged holes and differently-arranged apertures permits the adjustment of the angular orientation of the wear shoe relative to the side plate. More specifically, the wear shoe can be adjusted to a desired position and then fixed at that position—permitting the operator to "select" the amount of interference desired between the scraping edge sections and the surfaces being plowed.

Figure 30:
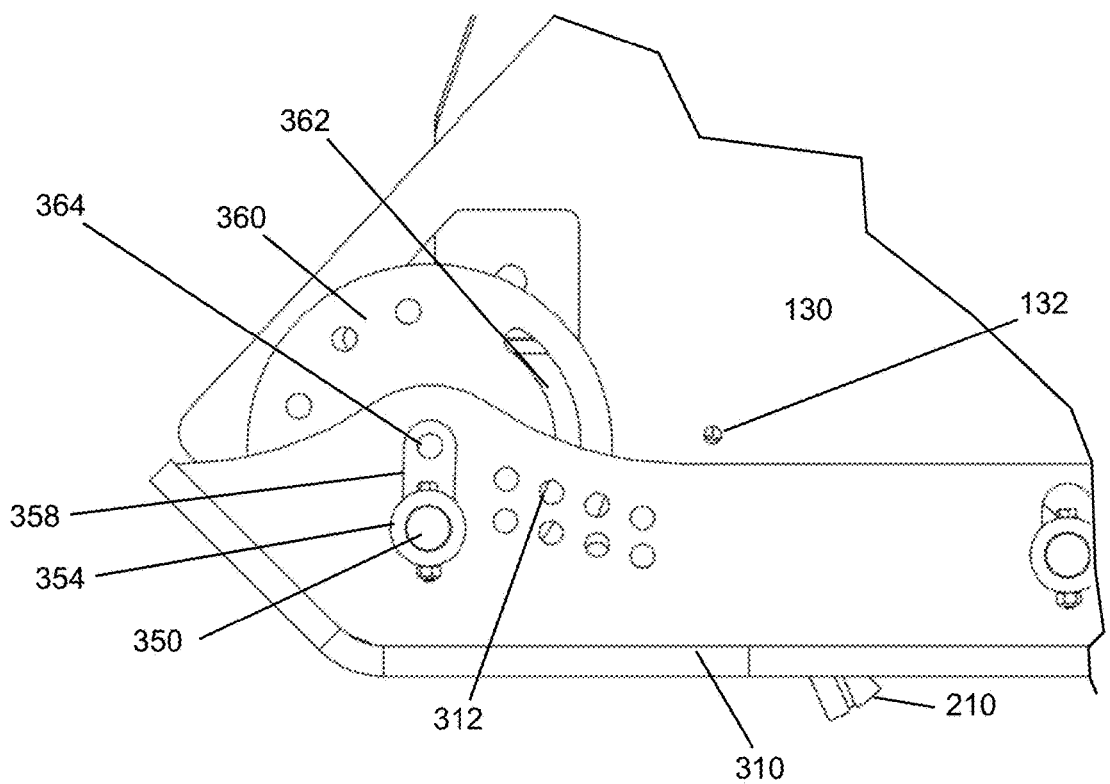

Alternatively, as illustrated in FIG. 30, a cam 360 may be employed to adjust the relative angle of the wear shoe, where a cam-shaped slot 362 having a continuously-varying surface separated from a pivot at 364, is used and aligned with an aperture in a rearward portion of the wear shoe 310, and then fastened thereto. When a configuration as depicted in FIG. 30 is employed, an essentially continuously-varying adjustment of the wear shoe orientation relative to the side plate may be achieved.

Referring once again to FIG. 9, the upstanding transverse blade of the containment plow (material pusher) may also incorporate, during manufacturing/assembly, an assembly pin 108 extending outward beyond the vertical edge 122 on one or both ends of the transverse blade 112. Furthermore, each vertical side plate 130 includes a pin-receiving aperture or hole 132 for receiving the pin 108 therein and permitting a consistent positioning of the side plate relative to the transverse blade edge to facilitate assembly of the containment plow. The pin may later be welded and/or ground to remove any appearance of the hole and pin in sideplate 130.

Having generally described the material pusher 100, attention is turned to a description of the components and features of the floating coupler system as illustrated in FIGS. 1-4, 8 and 11. As noted above, the floating coupler system may be employed on a containment plow, and in one embodiment the coupler includes a plurality of ribs 142 extending rearward from the containment plow, each of the ribs having at least two apertures 144 therein, a pair of longitudinal members 146 slidably located within the apertures of said ribs and attached at either end to a vertical spacer 150.

The spacer 150, attached at either end of the longitudinal members, separates the longitudinal members, and because the longitudinal members 146 are slightly longer than the distance between the outermost ribs 142, the longitudinal members can slide horizontally in the apertures 144, until the spacers 150 contact a respective outermost rib. Thus, the longitudinal members are allowed to slide in the both horizontal and vertical directions (e.g., arrows 170 in FIG. 11) and thereby allow the material pusher to "float" or move slightly relative to the vehicle attached the attachment mechanisms or interface components 154. The pair of longitudinal members are parallel to one another so as to permit them to freely slide yet maintain contact with the web apertures. And, as depicted for example in FIG. 3, they may also be vertically and horizontally offset from one another. Another advantage realized through the use of assembled components for the floating coupler is that in addition to the "float" it provides between the prime mover vehicle 102 and the material pusher, the floating coupler also may be changed/repaired in the event of a damaging impact. The longitudinal members 146 may be unbolted from the side spacers 150 and a damaged coupling system component easily replaced in the field so as to avoid the need to transport the material pusher for repair or to await a welder.

The floating coupler system 140 includes at least one attachment mechanism or interface 154 attached to the longitudinal members and providing an interface for releasable attachment to the vehicle or a component thereof. In one of the illustrated embodiments, the attachment mechanisms may include a pair of parallel posts extending rearward from the pusher and coupler system. Such a system provides a slot 152 to receive a bucket edge from a loader or backhoe vehicle. Alternatively, as is also illustrated, the attachment mechanisms may include a pair of components that are designed to receive a quick-coupler or similar device attached on a vehicle (e.g., a skid steer loader). As will be appreciated, the "frame" of the floating coupler system, and particularly the longitudinal members 146, provide a structure to which any number of alternative attachment mechanisms may be connected or clamped, including the embodiments shown as well as bucket clamps and custom connections for a wide variety of prime mover vehicles. In the illustrated embodiments for the attachment mechanisms, vehicle attachment components are attached to the pair of longitudinal members using a removable, clamp-type connection as illustrated in detail in FIGS. 8 and 11, where a generally C-shaped clamp section fits around the longitudinal members and is compressed thereabout by one or more bolts 156. Another advantage of the clamp-on type attachment mechanisms is the ability to employ multiple mechanisms on a single coupler (plow), and to easily change attachment mechanisms by simply removing a few bolts used to clamp the attachment mechanisms to the longitudinal members—no welding or modification is required. While depicted as clamp-on devices, it is also possible to employ alternative and even a more permanent attachment method, and the attachment mechanisms or interfaces could be attached directly to the longitudinal members using bolts, welded, or otherwise permanently attached to the longitudinal members 146, or perhaps to the spacers 150 so as to be separable from the longitudinal members.

Figure 25:
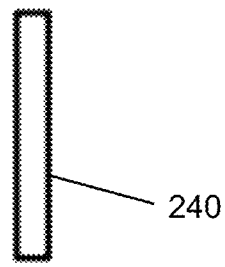
Figure 26:
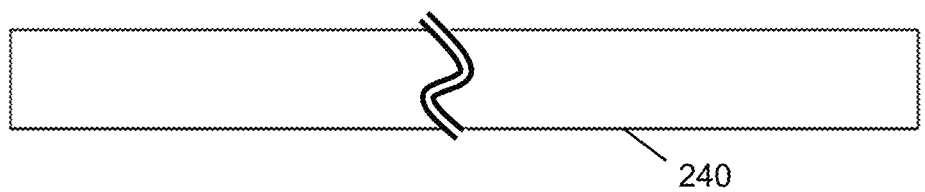
Figure 27:
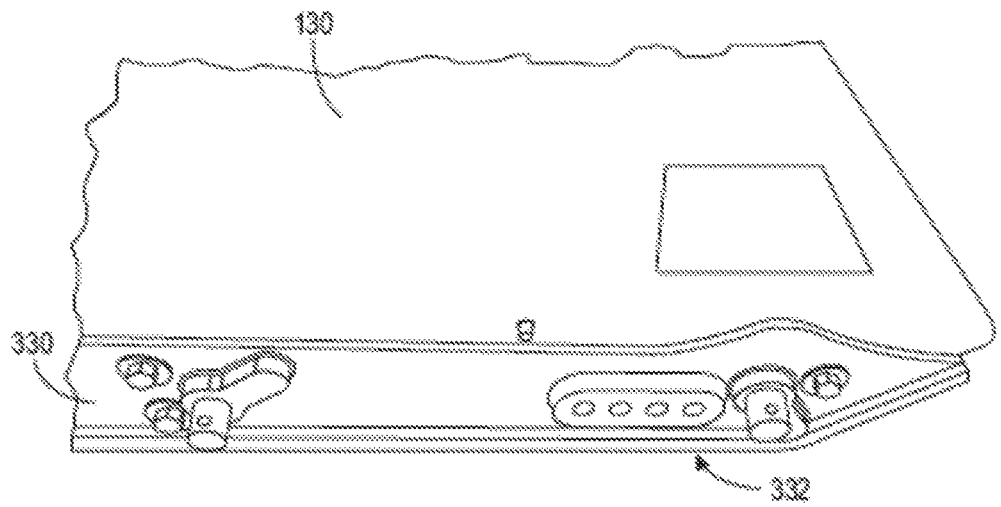
FIGS. 27-30 are detailed illustrations of alternative adjustable wear shoe configurations for use with an exemplary material pusher such as shown in FIGS. 1-8 and 10.
Figure 28:
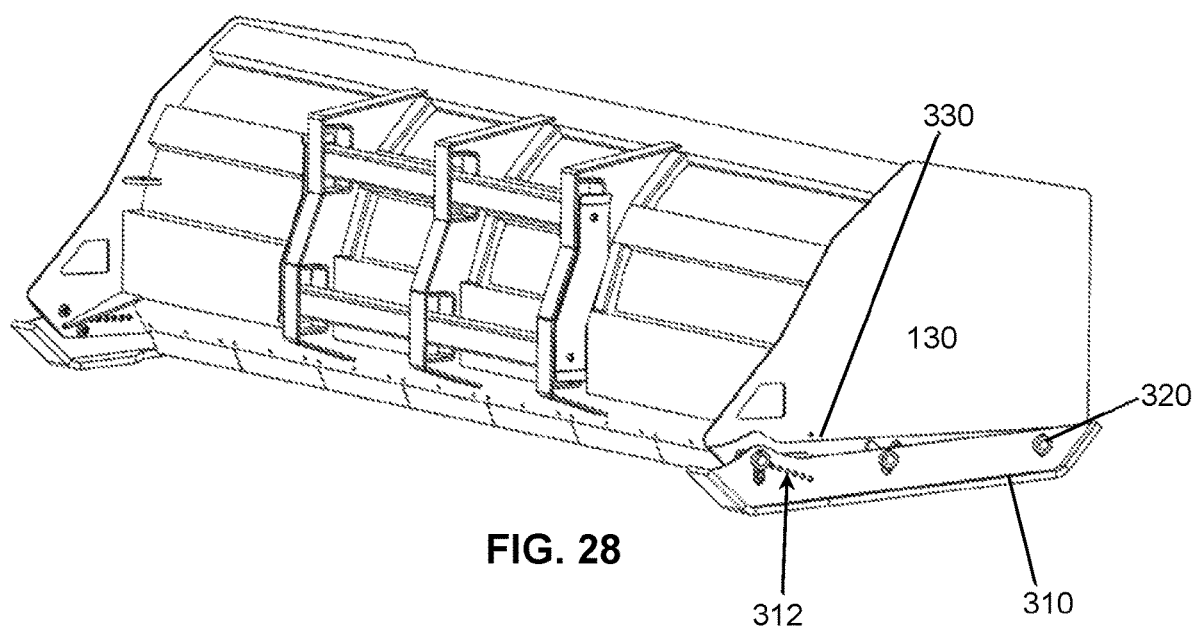
Figure 29:
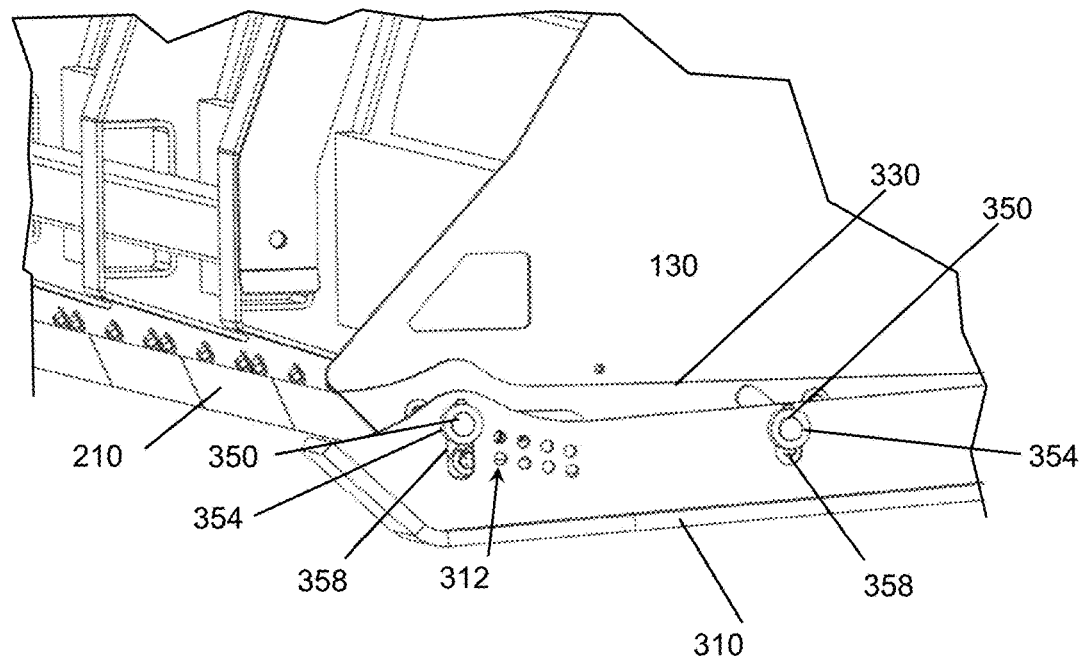

The longitudinal members 146 may be of any suitable cross-section (e.g. square or round as illustrated in FIG. 25) so long as the member slidably contacts the inner surface(s) of apertures 144. Moreover, the inner surfaces 145 of the apertures 144 may be constructed from a thickened or other wear-resistant steel or similar material to provide for longevity as the apertures are not replaceable like the longitudinal members are. Of note is the use of a "window" 160 in the side plate that allows a longitudinal member to pass through the window for installation within the lower apertures in webs 142. The window 160 also allows for the longitudinal member to be removed or replaced in the event it is damaged in use.

In an alternative embodiment, the floating coupler system 140 may include one or more resilient members or components that apply a biasing force that tends to reposition the floating coupler to a central or home position relative to the range of travel possible in the vertical and horizontal directions. Components such as urethane bumpers (e.g., within apertures 144 or on the inner surfaces of spacers 150), coil springs, leaf springs and the like may be employed for applying a biasing force between the movable components of the coupler system and the stationary parts or the material pusher itself.

Referring next to FIGS. 12-26, depicted therein are various embodiments directed to removable scraping edge sections 210 for use on a containment plow. It should be understood that one or a combination of the depicted scraping edge section embodiments may be employed on a material pusher such as that described above or on similarly-configured or pre-existing pusher designs—whether produced by Pro-Tech or another manufacturer.

Figure 12:
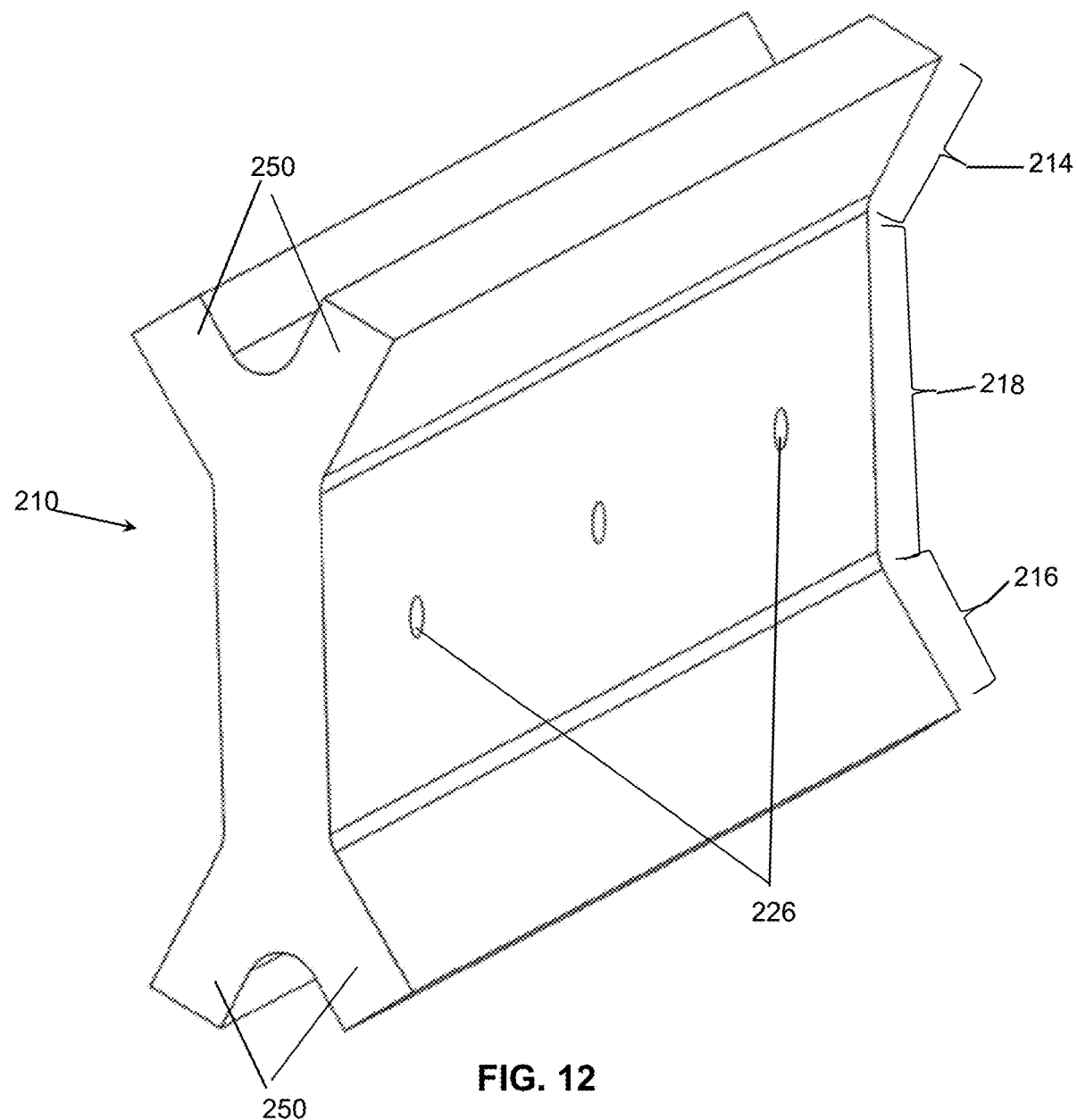
FIGS. 12-26 are illustrations of various embodiments of a scraping edge for use with a material pusher, such as depicted in the embodiments of FIGS. 1-8 and 10, particularly representing alternative components and cross-sections thereof, suitable for use with the material pushers of FIGS. 1-11.
Figure 13:
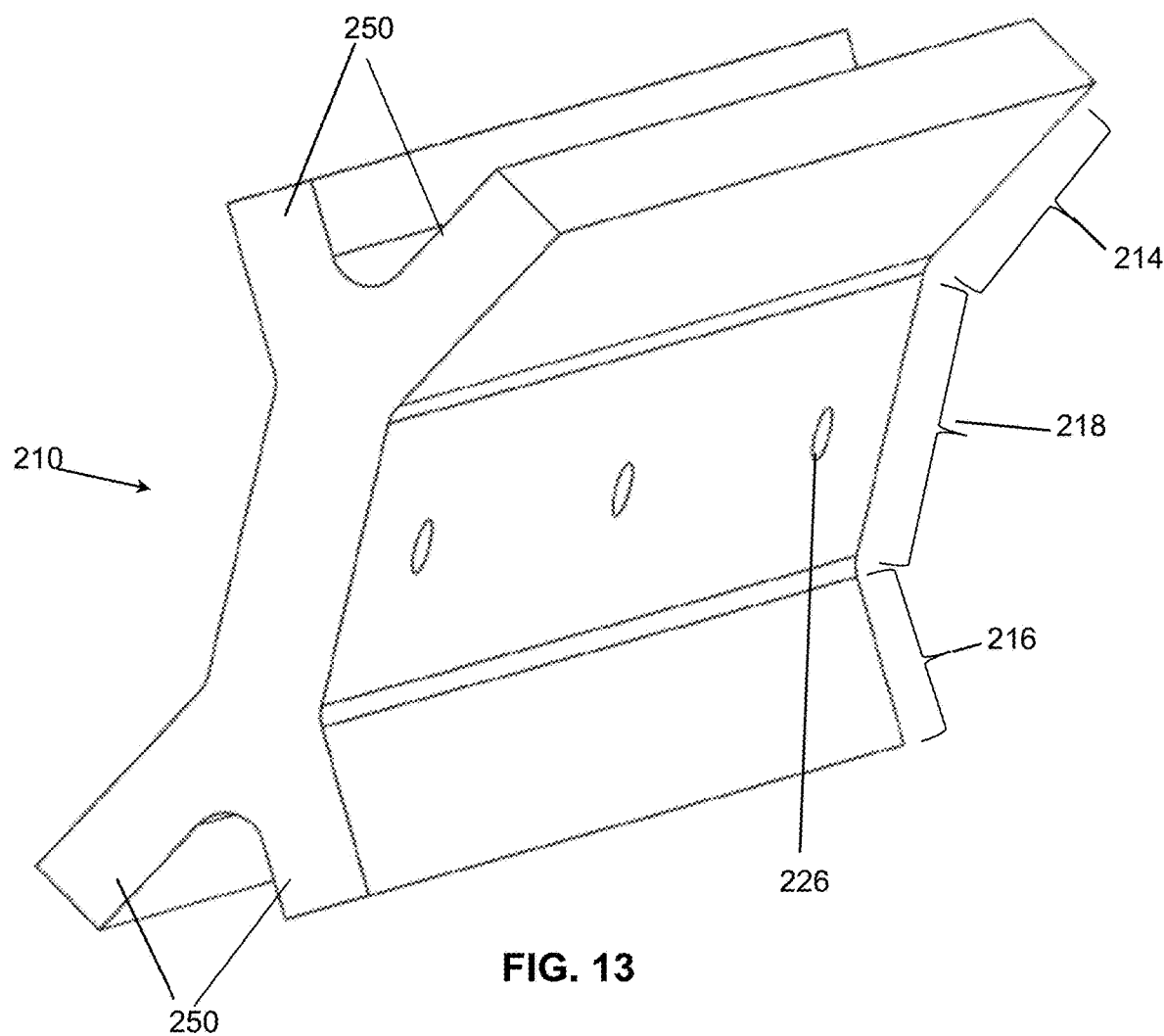
Figure 14:
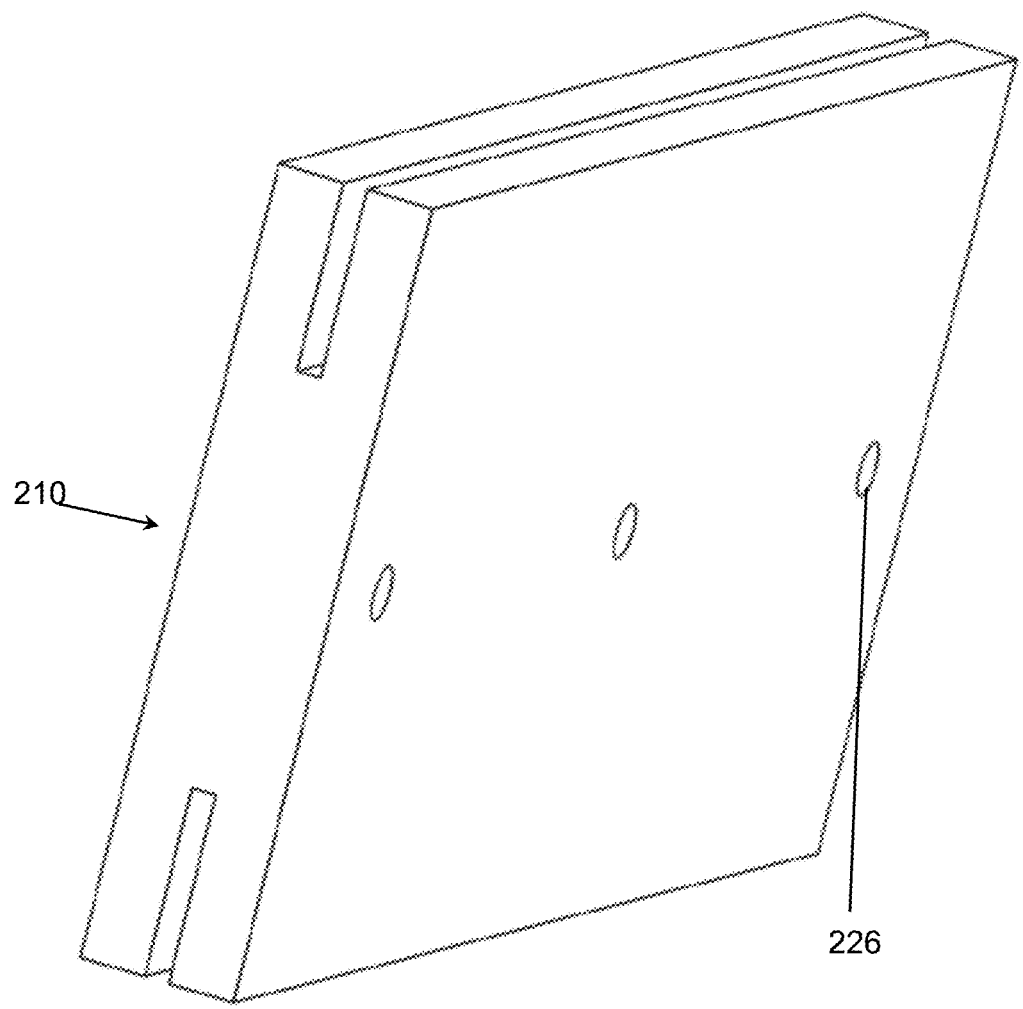

In the disclosed embodiments there are multiple-component scraping edges that may employ both a wear-resistant material such as a hardened-steel component molded into or infused within a flexible (rubber or polyurethane) component. The various components may be attached to one another using threaded bolts and nuts as well as other types of fasteners and anchors. As will be appreciated, slots, cuts and the like made in the flexible scraping edge backing material (e.g., rubber) are intended to provide relief and independent flexibility for portions of the scraping edge so that the component sections might independently conform or adapt to the surface being plowed. Depicted, for example, in FIGS. 12-13 are scraping edge section configurations where the resilient edge is able to present a plurality of faces that can be in contact with the surface, thereby assuring contact and continuity of contact between the edge and the surface. And, as illustrated in FIG. 15, the scraping edge section embodiments 210 may also include a wear-resistant material inserted longitudinally within the bottom of the scraping edge.

Turning to FIGS. 12-13, there are depicted scraping edge cross-sections in a general "dog-bone" shape, where at least two faces of the edge are presented to contact the surface being plowed. In the dog-bone configuration, the upper and lower regions of the scraping edge sections 210 each have a generally Y-shaped cross-section, and as shown in FIG. 13, the length of one of the legs 250 is longer than the other in order to provide two surface for plowing when the edge is attached to the bottom of the plow blade that is curved or angled forward.

Referring next to FIGS. 14-22 there are depicted various configurations of an "H-shaped" cross-section scraping edge section 210. In the illustrated embodiments for the H-shaped scraping edge, the scraping edge section 210 is formed of a rubber or polymer material such as a natural rubber compound including a polymer, carbon black, oil and a sulfur-based curing system, with a Shore A Durometer range of 55 to 80, and is flexible in at least one direction, so that it may bend or adapt to the surface being scraped. At least the front-facing exterior of the scraping edge sections in top region 214 and bottom region 216 there is a face with multiple angled surfaces, so that each face forms an acute angle with an adjacent face. The use of the acute-angle (approx. 80-85°) faces or "ribs" assures that there is a "sharp" edge 230 available for contact with the surface even if the bottom-most portion of the scraping edge is flexed, folded rearward or simply worn away. Another feature of the "ribs" or other longitudinal features on the face of the scraping edge sections is that they provide a wear indication, and in one embodiment they may correspond to a related adjustment setting, so that when wear to a certain point is evident the operator knows it is time to adjust the wear shoe angle to the next setting (i.e., reduce the angle between the wear shoe and the side plate, or lowering the blade edge toward the ground surface).

The H-shaped flexible scraping edge section 210 is intended to be reversible, so that once bottom region 216 has been word down, the edge section may be rotated 180-degrees so the top region 214 is then on the bottom when the edge section is re-attached to the blade. Each H-shaped edge section includes mounting holes 226 spaced along a mid-line thereof in the mid-section 218 of the scraping edge. Contrary to prior flexible scraping edge designs, there are no slotted holes that allow for adjustment of the vertical position of the scraping edge. In combination with the front-pivot, adjustable-angle wear shoes the edge does not have to be adjustable as any adjustments to assure contact between the scraping edge sections and the surface are accomplished by adjusting the wear shoe angle (i.e. position of the bottom edge of blade 114). Holes 226 are used to retain the scraping edge sections 210 in a generally fixed position relative to the bottom edge of the transverse blade 114. As will be appreciated, some of the H-shaped scraping edge cross-sections also include a recessed middle region 218 along a longitudinal face thereof for receipt of a backing plate. The use of a recessed region on the face of a section is advantageous to prevent the edge sections from sliding or creeping upward on the front face 116 of blade 114. Moreover, backing plate 220 may span a single edge section, or multiple adjacent edge sections to assure alignment of the adjacent sections.

Figure 19:
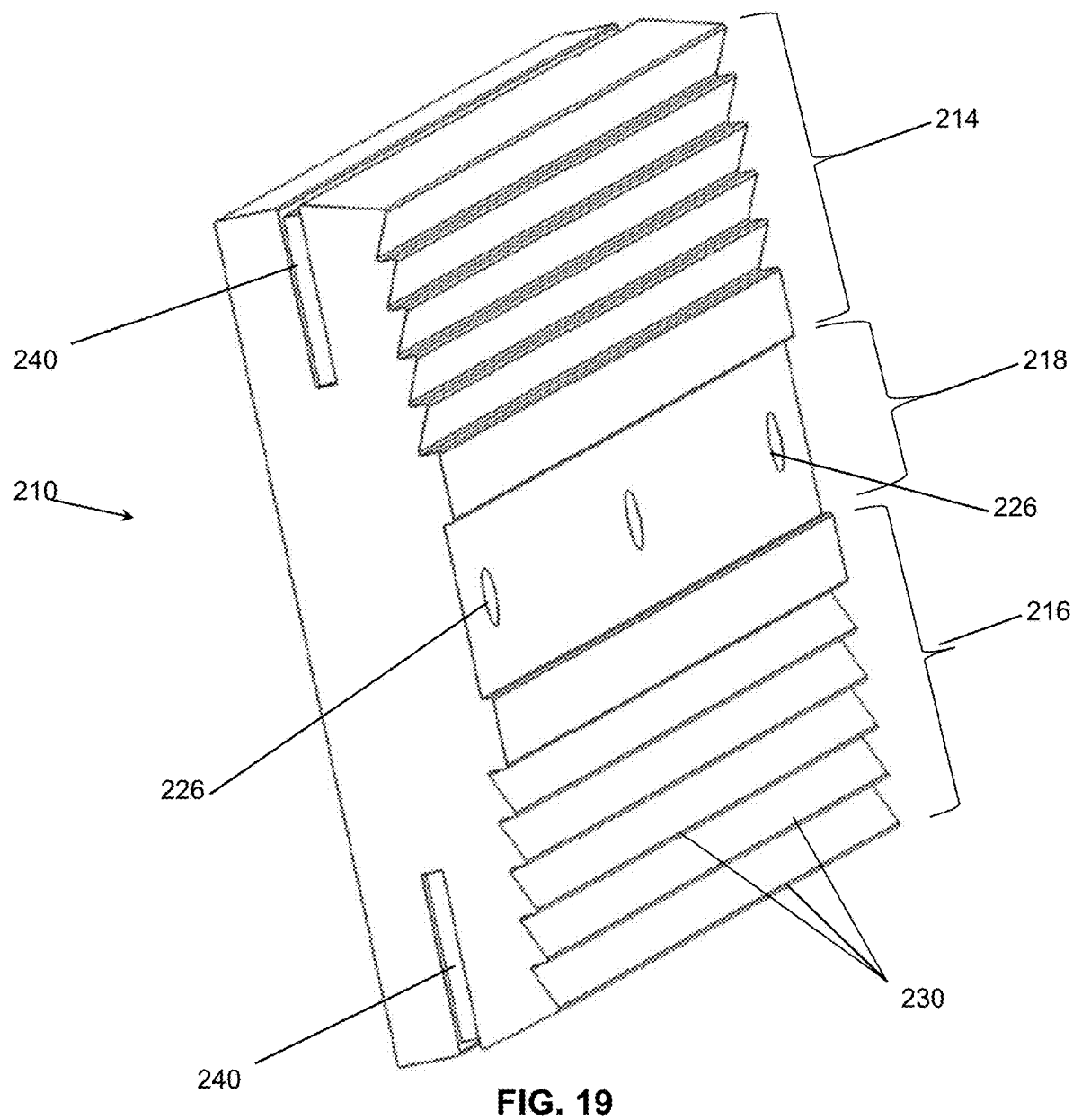
Figure 20:
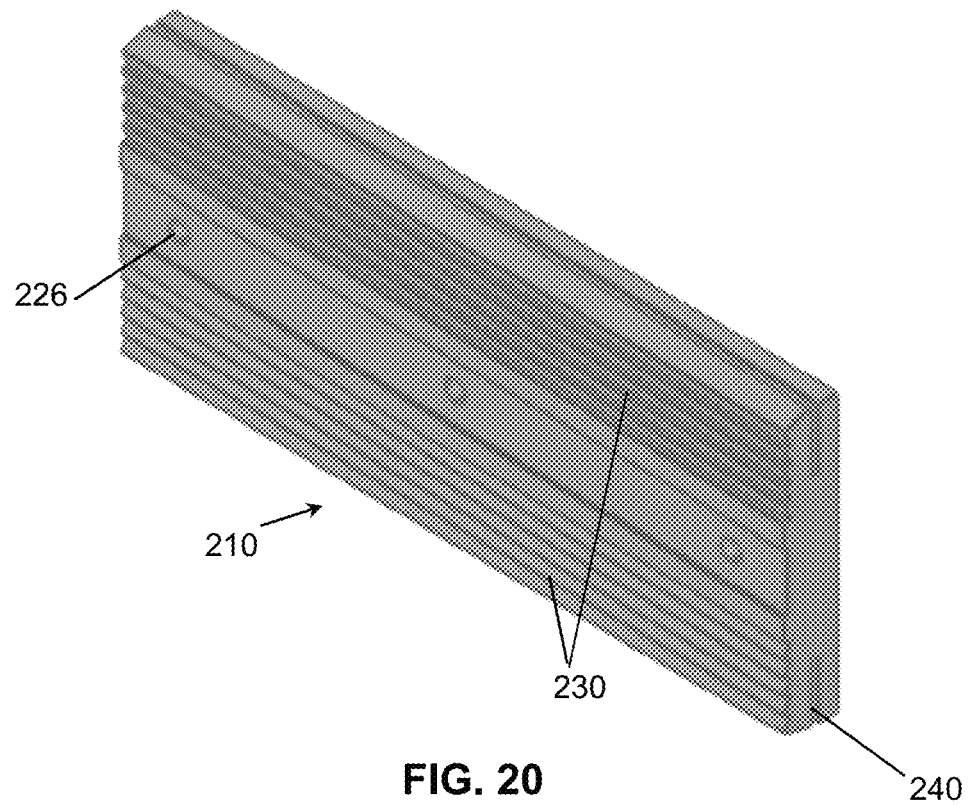
Figure 21:
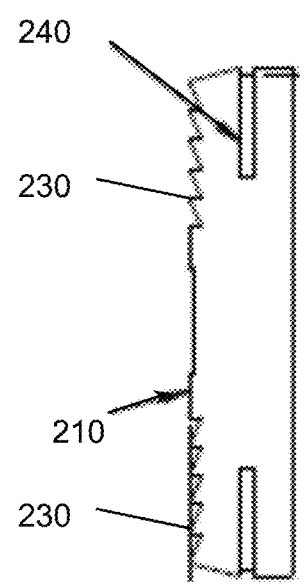
Figure 22:
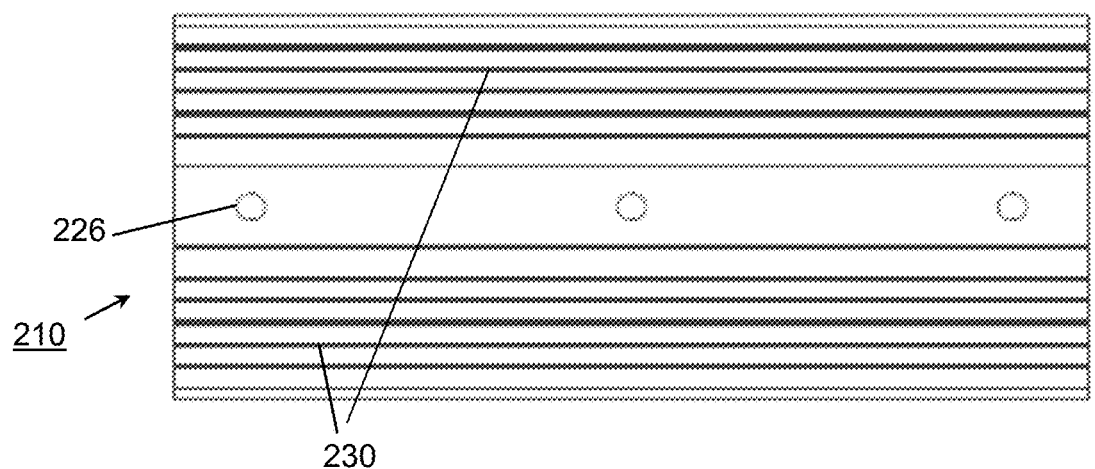

In the H-shaped scraping edge embodiments, scraping edge sections 210 may or may not include a wear resistant material, such as a wear-resistant insert 240 as depicted in FIG. 19 for example. And, as illustrated, for in FIGS. 14-22, the upper and lower edges thereof include a wear-resistant material inserted or infused longitudinally therein. Various wear-resistant materials may be employed for insert 240 (also see FIGS. 24-26 for further views of the insert), including high-durability polymers, metals (e.g., steels) and ceramics, as well as composites and combinations thereof. In one embodiment, the length of the steel insert is equal to or slightly shorter than the length of the scraping edge section, and has a height of 1.5 in. to 3.0 in. (3.8 cm-7.6 cm) and preferably approximately 2.0 in. (5 cm), with a thickness approximating the widths of the slot in the H-shaped cross-section. In one embodiment the thickness may be between 0.125 in. and 0.5 in. (0.3-1.3 cm), or 0.25 in and 0.375 in. (0.6 cm-0.95 cm), and perhaps 0.25 in. (0.64 cm). Ideally the wear-resistant insert, when operatively affixed within and combined with the flexibility of the scraping edge, provides suitable stiffness and wear-resistance to improve the life of the scraping edge, while the scraping edge section itself provides flexibility so that the edge does not damage or excessively wear the surface being plowed. As another alternative embodiment, while the H-shaped cross-section embodiment illustrates the insert approximately centered in the thickness of the edge section, alternative configurations are contemplated, including moving the insert toward the front-most (e.g., ribbed surface), or even angling the insert slightly (e.g., bottom-forward) in order to decrease the break-in time and provide for the insert material to be exposed more quickly.

In one embodiment, insert 240 is molded into and part of the scraping edge section in order to assure that it is retained in position during use. Moreover, in the case of a metal insert that may be subject to corrosion, the insert may be "over-molded" so as to be entirely encompassed or encased within the flexible rubber or polymeric material in order to provide protection from exposure and resulting corrosion during storage or even use (e.g, the upper, unused portion). In one embodiment, at least approximately 0.125 in. (0.3175 cm) of rubber material covers the insert 240. The steel used is surface treated to assure adherence to the flexible edge material, and a low hardness (e.g., Brinnel range of 75 to 450) material is employed for the insert in one embodiment. While a high-hardness or hardened material may be employed, the result may be increased damage or wear to the surface being plowed. Thus, non-hardened steels may be advantageous as they could provide some conformity.

It will be appreciated that the scraping edge sections 210 may take on various alternative profiles and cross-sections. In one example the edge section may be a non-reversible edge including only mid-region 218 and lower region 216, yet still provide extended life as the result of an elongated scraping region. Other alternative embodiments may include an extended edge region with the intended outcome of a longer life and improved scraping performance, an angled mounting surface to alter the attack angle of the surface contact (bottom) edge when mounted on a blade, or an added leg or extension so that once the lower leg is worn the scraping edge remains usable because the second (upper) leg would be in contact with the surface being plowed. It will also be appreciated that a C-shaped scraping edge cross-section could be used, where the upper (214) and lower (216) regions of the reversible scraping edge are adapted to extend forward or outward from the lower blade edge at a forward-biased angle to increase the angle of attack of the contact edge. Also contemplated is a layered configuration where a flexible, albeit harder (wear-resistant) middle layer is employed in order to reinforce and improve the wear performance of the scraping edge section 210.

Figure 23:
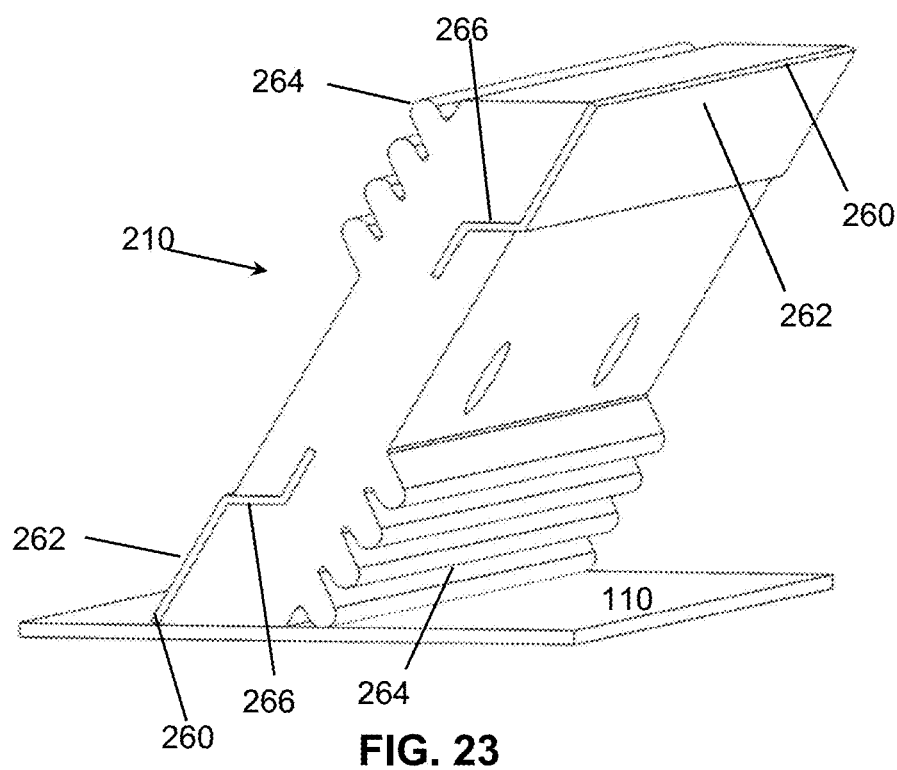
Figure 24:
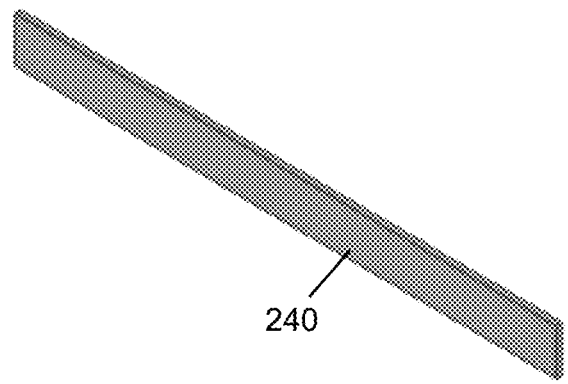

FIG. 23 represents an embodiment with a combination scraping edge section design that includes a reinforced contact edge 260 (thicker and with a hardened metal or similar face 262), along with surface contacting rear faces 264 (angled and rounded) as well as stress-relieving "cuts" 266 that facilitate the edge 210 being able to be deformed or pushed rearward upon contact with a surface imperfection, curb, etc. As will be appreciated the embodiments for the combination edge section of these figures is also reversible, but in doing so the edge section would not only be rotated by 180-degrees, but flipped front-for-back.

In summary, the various disclosed scraping edge section embodiments provide various configurations for a resilient scraping edge section that is suitable for presenting a plurality of faces for contact with a surface to be plowed. The scraping edge section is flexible in at least one direction, and in several of the disclosed embodiments at least one face of the scraping edge section forms an acute angle with an adjacent face. Moreover, a number of the embodiments disclose a flexible scraping edge section that is both replaceable and even reversible (top to bottom). While depicted in embodiments where the scraping edge section includes a plurality of mounting holes spaced along a line in the mid-section or top thereof—the holes being used to affix and retain the scraping edge section in a generally fixed position relative to a bottom edge of the transverse blade 114—it will be appreciated that the scraping edge configuration is not necessarily limited by the mounting technique, and that other methods may be applicable. Indeed, several of the disclosed scraping edge sections further include a recessed region along a face of the section to receive a backing plate. The backing plate may span a single edge section, or multiple adjacent edge sections.

In several of the disclosed scraping edge embodiments the section includes a wear resistant material. And, in some the material includes a wear-resistant insert. The insert may be infused or sandwiched between to faces or legs of the edge section, such as was described and illustrated for the H-shaped scraping edge sections. And another feature of several scraping edge section embodiments is a ribbed or angled-face design, where one of more adjacent surfaces on the scraping edge section form an acute angle between them in order to provide for a plurality of scraping faces, particularly when the scraping edge is flexed or worn.

It is known to employ pivoting wear shoes such as those discussed in U.S. Pat. No. 9,243,376 (Jan. 26, 2016) to Pro-Tech, which is hereby incorporated by reference in its entirety. However, in the embodiment disclosed herein it is the combination of an adjustable position—meaning fixed while in use but adjustable between uses—in conjunction with one or more of the scraping edge sections embodiments disclosed above. In combination the two components improve the performance of the material pusher, particularly in varying snow and ice conditions.

The adjustable wear shoe 310, further depicted for example in FIGS. 27-30, is freely pivotally attached by a pin 320 adjacent a front edge of the vertical side plate 130. The angular orientation of each wear shoe 310 relative to the respective side plate 130 is adjustable to one of a plurality of fixed positions to control, among other things, the amount of contact between the scraping edge sections 210 and the surface 110. The angle may be generally adjustable over a range of approximately zero to fifteen degrees, for example, from say minus five-degrees (−5°) to plus 10-degrees (+10°), or alternatively zero-degrees (0°) to ten-degrees (+10°), where the angular range may also be a function of the containment plow design (e.g., height and adjustability of the scraping edge).

In one embodiment, each side plate 130 includes a bolt-on pin plate 330, attached to the outer surface of side plate at a location adjacent the lower edge of the side plate. Notably, in an alternative embodiment it may be possible to provide the features described relative to the pin plate directly as part of the vertical side plate 130 instead of as a bolt-on pin plate 330. The pin plate 330 includes at least front pivot pin 320 aligned to pass through a corresponding aperture in the wear shoe 310. The pin plate 330, for example, includes a plurality of arranged holes 332 and the wear shoe 310 also includes a plurality of differently-arranged apertures 312 so that a fastener passing through different combinations of arranged holes and differently-arranged apertures permits the adjustment of the angular orientation of the wear shoe relative to the side plate. More specifically, the wear shoe can be adjusted to a desired position and then fixed at that position—permitting the operator to "select" the amount of interference desired between the scraping edge sections and the surfaces being plowed. Additionally, the wear shoe assembly may include other pins 350, which extend from the pin plate 330, and which pass through slotted apertures 358 in the wear shoes. The pins 350 are terminated with a collar 354 or similar mechanism to assure that the wear shoe, while pivotally sliding relative to side plate 130 and pin plate 330, is both limited in its travel and held on to the pins FIG. 30 illustrates, as noted above, the alternative embodiment where a cam 360 is used to adjust the relative angle of the wear shoe. The cam-shaped slot 362 has a continuously-varying separation from a pivot point at 364, and the cam slot is used and aligned with an aperture in a rearward portion of the wear shoe 310, and then fastened when the desired wear shoe angle (contact between the scraping edge and surface) is found. When a configuration as depicted in FIG. 30 is employed, an essentially continuously-varying adjustment of the wear shoe orientation relative to the side plate may be achieved.

Figure 11:
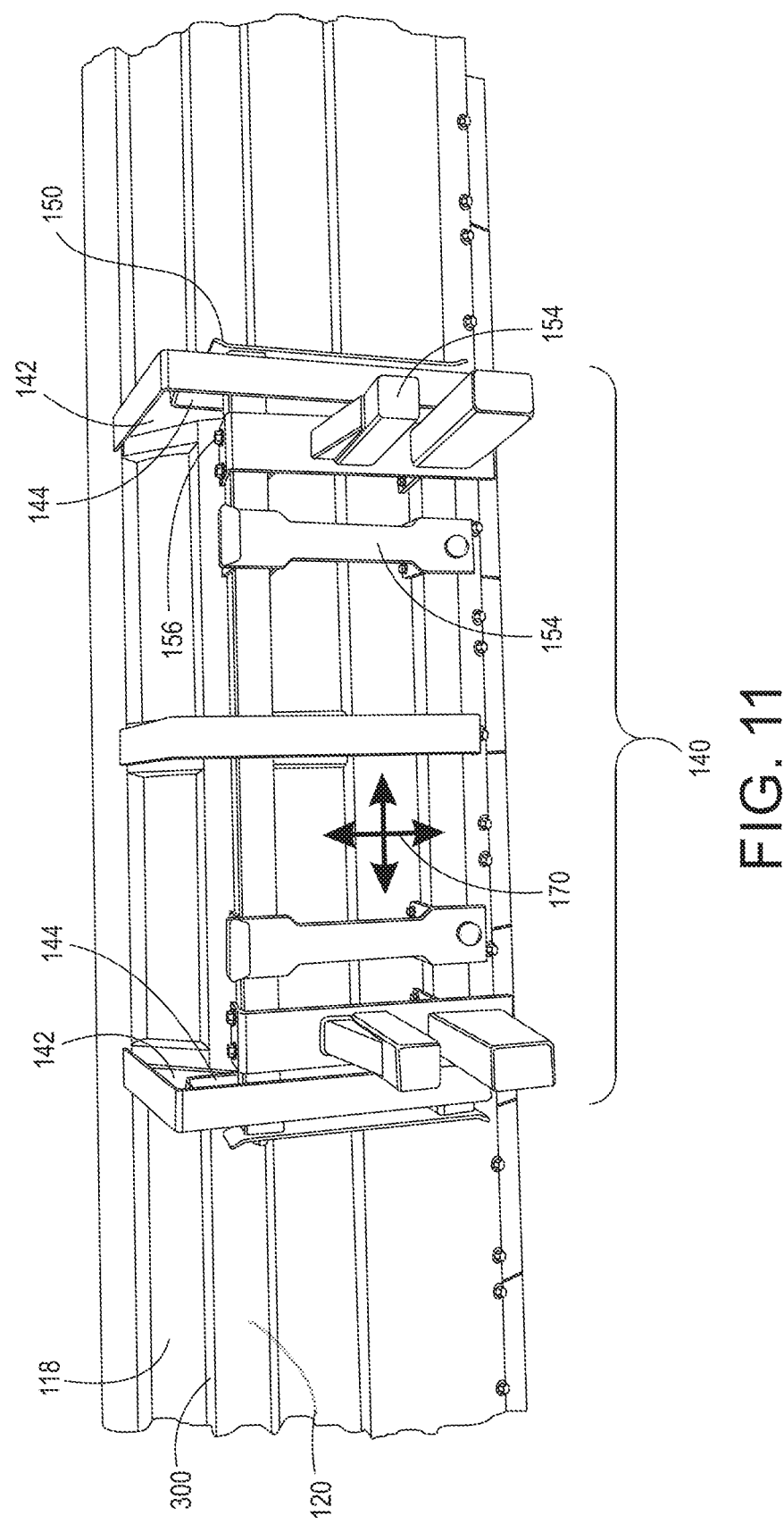
FIG. 11 is a view of the rear of the improved material pusher or containment plow in accordance with the embodiment of FIG. 1.

Lastly, as represented by the illustration of FIG. 11, the disclosed material pusher intentionally reduces or eliminates liquid-collecting surfaces by assuring that surfaces of the pusher are angled to shed water. For example, at least one longitudinal channel 120 contacts the rear surface 118 of the blade at surface 300 at a downward-sloping angle when the containment plow is in a position suitable for use on a horizontal surface. The downward-sloping or angled surface 300 facilitates the shedding of liquid (e.g., water) therefrom.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. A removable scraping edge for use on a containment plow for plowing a surface, comprising:
    a resilient scraping edge section, said scraping edge section including, on a front face thereof, a plurality of ribs, each of said ribs terminating in an edge for contact with the surface and
    said scraping edge section further including mounting holes to facilitate attachment to the containment plow.

2. The removable scraping edge section of claim 1, where the scraping edge section is flexible in at least one direction.

3. The removable scraping edge section of claim 1, where at least a first surface of the scraping edge section rib forms an acute angle with a second adjacent rib surface.

4. The removable scraping edge section of claim 1, where the flexible scraping edge section includes opposed scraping edges along both of two longitudinal sides, and is reversible.

5. The removable scraping edge section of claim 1, where the scraping edge section includes a recessed region along a longitudinal face thereof for receipt of a backing plate.

6. The removable scraping edge section of claim 5, where the backing plate spans at least one adjacent edge section.

7. The removable scraping edge section of claim 1, where the scraping edge section includes a wear resistant material.

8. The removable scraping edge section of claim 1, where each scraping edge section includes a wear-resistant insert.

9. The removable scraping edge section of claim 8, where said scraping edge section has an H-shaped cross-section, and where upper and lower edges of said scraping edge section include a wear-resistant material inserted longitudinally therein.

10. The removable scraping edge section of claim 9, where the wear-resistant material includes steel.

11. The removable scraping edge section of claim 1, wherein each scraping edge section has a dog-bone shaped cross-section.

12. The removable scraping edge section of claim 1, wherein said ribs include a plurality of acutely angled ridges parallel to the scraping edge.

13. A reversible, removable scraping edge for use on a containment plow for plowing a surface, comprising:
    a reversible resilient scraping edge section including a flexible material having a mid-section between opposed parallel scraping edges; and
    an insert made of a wear-resistant material operatively affixed along both each of the opposed parallel scraping edges.

14. A removable scraping edge for attachment along a bottom edge of a plow blade used for plowing a surface, comprising:
    at least one resilient scraping edge section, where said scraping edge section includes a continuous wear-resistant insert along a longitudinal edge of the scraping edge section; and
    said scraping edge section further including mounting holes to facilitate attachment to the bottom edge of the plow blade.

15. The removable scraping edge according to claim 14, where said flexible scraping edge section includes opposed scraping edges along both of two longitudinal sides each including a continuous wear-resistant insert, such that the flexible scraping edge section is reversible.

16. The removable scraping edge according to claim 14, where said flexible scraping edge section has an H-shaped cross-section, and where both an upper edge and a lower edge of said scraping edge section each include a continuous wear-resistant insert longitudinally therein.

17. The removable scraping edge according to claim 14, where the wear-resistant insert includes steel.

18. The removable scraping edge according to claim 14, where the wear-resistant insert exhibits a Brinnel hardness of between 75 and 450.

19. The removable scraping edge according to claim 14, where said flexible scraping edge section includes a flexible rubber or polymeric material, and the wear-resistant insert is encased within the flexible rubber or polymeric material to protect the wear-resistant insert from exposure.

* * * * *